(12) United States Patent
Paris et al.

(10) Patent No.: US 9,660,967 B1
(45) Date of Patent: May 23, 2017

(54) BIG DATA MARKERS FOR STREAM LABELING, IDENTIFICATION AND DECODING

(71) Applicant: Centri Technology, Inc., Seattle, WA (US)

(72) Inventors: Luis Gerardo Paris, Maple Valley, WA (US); Michael Patrick Mackey, Lake Stevens, WA (US)

(73) Assignee: Centri Technology, Inc., Seattle, WA (US)

( * ) Notice: Subject to any disclaimer, the term of this patent is extended or adjusted under 35 U.S.C. 154(b) by 0 days.

(21) Appl. No.: 15/402,122

(22) Filed: Jan. 9, 2017

(51) Int. Cl.
*H04L 29/06* (2006.01)
*H04L 9/14* (2006.01)
*H04L 9/00* (2006.01)
*H04L 9/30* (2006.01)
*H04L 9/32* (2006.01)
(Continued)

(52) U.S. Cl.
CPC .......... *H04L 63/0464* (2013.01); *H04L 9/006* (2013.01); *H04L 9/0861* (2013.01); *H04L 9/0894* (2013.01); *H04L 9/14* (2013.01); *H04L 9/30* (2013.01); *H04L 9/3263* (2013.01); *H04L 63/06* (2013.01); *H04L 63/083* (2013.01); *H04L 65/60* (2013.01); *H04L 65/602* (2013.01); *H04L 65/607* (2013.01); *H04W 12/04* (2013.01); *H04W 12/06* (2013.01); *G06F 21/62* (2013.01); *G06F 21/6218* (2013.01); *G06F 2221/2141* (2013.01); *H04L 2209/80* (2013.01)

(58) Field of Classification Search
CPC ....... H04L 29/06; H04L 65/60; H04L 65/602; H04L 65/607; H04L 63/0464; H04L 63/06; H04L 63/083; H04L 9/006; H04L 9/0894; H04L 9/0861; H04L 9/14; H04L 9/30; H04L 9/3263; G06F 21/62; G06F 21/6218; G06F 2221/2141; H04W 12/04; H04W 12/06
USPC ........................................................ 713/165
See application file for complete search history.

(56) References Cited

U.S. PATENT DOCUMENTS

| 7,917,771 B2 * | 3/2011 | Forlenza ................. | H04L 9/088 380/260 |
| 2012/0184202 A1 * | 7/2012 | Gadoury ................ | H04H 20/10 455/3.06 |

(Continued)

*Primary Examiner* — Jayesh Jhaveri
(74) *Attorney, Agent, or Firm* — John W. Branch; Lowe Graham Jones PLLC

(57) ABSTRACT

Embodiments are directed towards a big data marker (BDM) model that provides label support, seeking, and decoding of arbitrary positions within small or large data streams. The features of the BDM model may be provided by a library having an easy-to-use application programming interface. The library may be considered an extension to existing data optimization and/or data encryption codecs that provides additional labeling and random access capabilities for encoding and decoding. The library enables labeling and seeking of single or multiple labels associated with various positions in a data stream, and allows encoding and decoding of full or partial streams. The library may be used with applications that already manage big data sets for archiving, logging, or backups. The library can also extend the capabilities of existing codecs by enabling the inclusion of labels and random access encoding/decoding via a common programming interface.

30 Claims, 12 Drawing Sheets

(51) Int. Cl.
*H04L 9/08* (2006.01)
*H04W 12/06* (2009.01)
*H04W 12/04* (2009.01)
*G06F 21/62* (2013.01)

(56) References Cited

U.S. PATENT DOCUMENTS

2012/0204036 A1* 8/2012 Wack ................... G06Q 40/02
 713/189
2014/0359155 A1* 12/2014 Wan ................... H04L 65/4076
 709/231
2015/0026462 A1* 1/2015 Ramesh ............. G06F 21/6218
 713/165

* cited by examiner

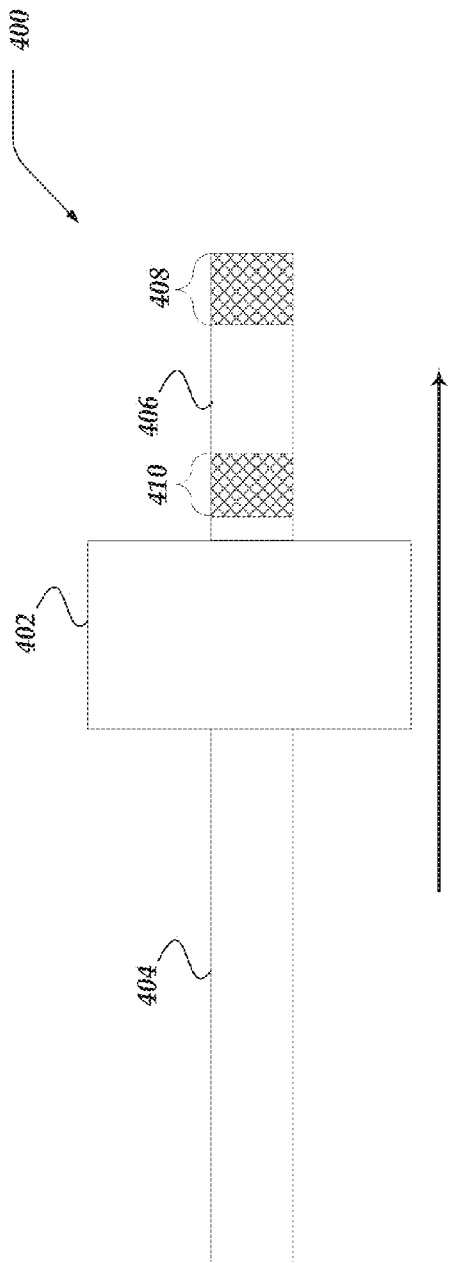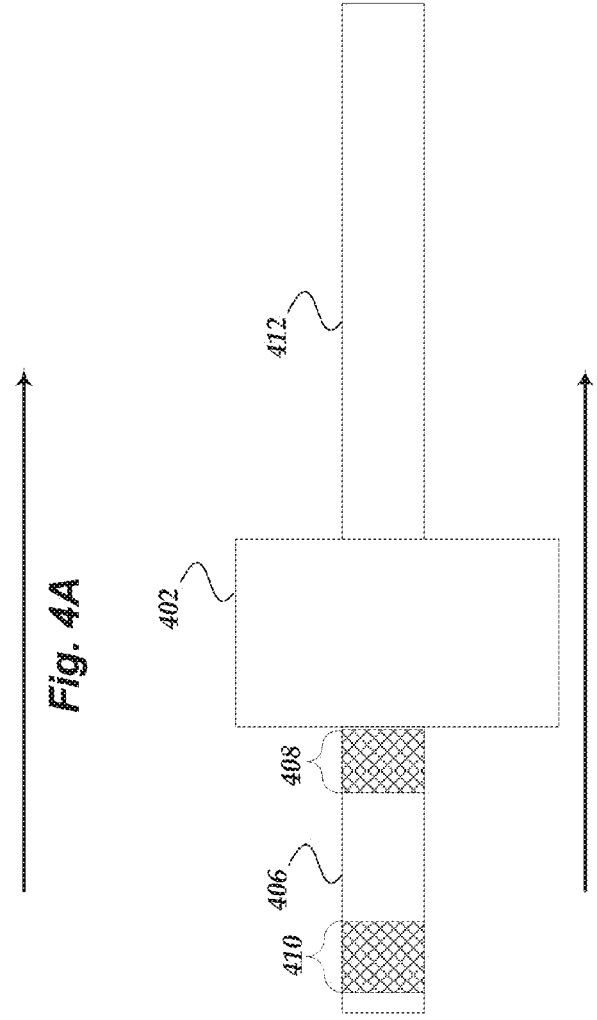

US 9,660,967 B1

BIG DATA MARKERS FOR STREAM LABELING, IDENTIFICATION AND DECODING

TECHNICAL FIELD

The invention relates generally to encoding or decoding documents, and more particularly, but not exclusively to encoding or decoding large-sized documents.

BACKGROUND

The advent of the digital age has brought along a myriad of interconnected devices and a plethora of interactive multimedia applications than ever before. The space and bandwidth required to drive the data footprint consumed by these applications has also skyrocketed to unprecedented levels. Data is growing so rapidly that the term "big data" was coined to deal with the large, complex data sets that stem from these apps. These large datasets may make it a technological or logistical challenge to perform what once were standard data operations. Further, if encryption or compression are combined with big data, many previously standard data operations may become intractable. Thus, it is with respect to these considerations and others that the subject innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 4A illustrates a logical schematic showing a data coding server computer being provided an input stream for encoding in accordance with one or more of the various embodiments;

FIG. 4B illustrates a logical schematic showing a data coding server computer being provided an encoded stream for decoding in accordance with one or more of the various embodiments;

DETAILED DESCRIPTION OF VARIOUS EMBODIMENTS

Figure 1:
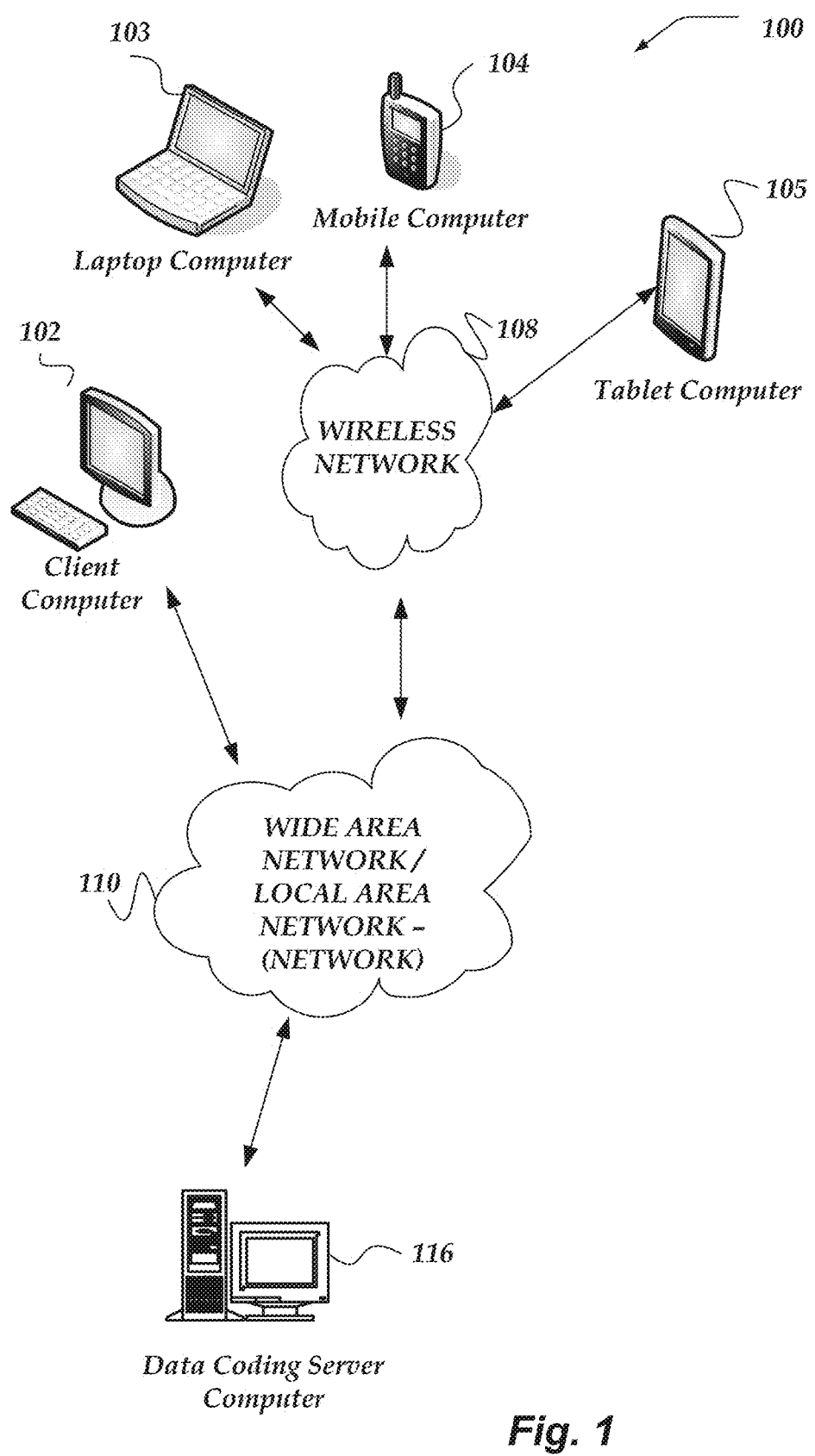
FIG. 1 is a system diagram of an environment in which embodiments of the invention may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, computers, or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms, "encoding," and "decoding," refer to cryptographic operations that may be performed on data. Generally, encoding may refer to one or more cryptographic operations that may be performed on data to secure it for transmission and/or storage. In some cases, data may be encoded using public key/private key cryptography. In other cases, cryptographic operations may employ symmetric keys. Further, in some embodiments, operations such as compression or decompression may be employed before and/or after data is encoded or decoded. Accordingly, herein it is assumed that encoding, decoding, and cryptographic operations may include one or more additional steps such as compression, decompression, data padding, data seeding, or the like, or combination thereof.

As used herein the terms, "sequential encoding" refers to encoding where the output of the encoder depends on the previously encoded data. Some sequential encoders may be arranged to have an initial cryptographic state that may be based on one or more cryptographic keys, cryptographic seeding, shared secrets, or the like, or combination thereof. Accordingly, the initial cryptographic state is combined with the initial input data to produce encoded data. However, the sequential encoder may be arranged such that encoding data modifies the cryptographic state of the sequential encoder. Thus, the subsequent portions of input data will be encoded using a cryptographic state that is dependent on the previously encoded portions of the data.

As used herein, "sequential decoding" refers to decoding encoded data that was encoded using a sequential encoding. Accordingly, the encoded data needs to be decoded in the same order it was encoded since there are sequential dependencies introduced by a sequential encoder. Accordingly, the initial cryptographic state of a sequential decoder may be initialized using one or more cryptographic keys, cryptographic seeding, shared secrets, or the like, or combination thereof. But subsequent cryptographic state will depend on the previous cryptographic state and the previous portions of the data being decoded.

As used herein "cryptographic state" refers to data used by encoders or decoders while encoding or decoding or data. In some cases, cryptographic state may be comprised of electronic code books, buffered data, pipeline data, counters, cryptographic keys, cryptographic certificates, pseudo random numbers, real random numbers, timers, or the like, or combination thereof. Some encoders or decoders may be arranged to dynamically modify at least a portion of their cryptographic state based on the input data being encoded or decoded.

As used herein "encoder" refers to a software library or hardware processor that is arranged to perform one or more data encoding operations. Encoding operations may include encryption, compression, or the like. Also, encoders may be arranged to perform one or more supporting operations, such as, executing cryptographic hash functions, providing random numbers (e.g., pseudo-random numbers or real-random numbers), cryptographic key management, generating shared secrets, cryptographic signing, cryptographic authentication, cipher negotiation, cipher management, or the like, or combination thereof. In some cases, encoders may be built-in to an encoding engine. In other cases, encoders may be separate from the encoding engine. For example, an encoding engine may be arranged to employ one or more encoders built into a hardware security module (HSM). In some embodiments, a single encoder may support more than one cipher suite. In some cases, the cipher suites employed by an encoder may be well-known or otherwise standards based. In other cases, cipher suites may include custom operations. Further, in some cases, encoders that support custom cipher suites may employ one or more well-known or standards based cryptographic operations (e.g., SHA2 hashing, or the like) as part of the custom cipher suite.

As used herein "decoder" refers to a software library or hardware processor that is arranged to perform one or more data decoding operations. Generally, the above definition for encoders applies to decoders except that decoders produce decoded data from encoded data. Further, in some cases, an encoder and a decoder may be part of the same software library or hardware device. In other cases, the encoder and decoder may be separate from each other. Also, decoders should support the same or similar cipher suites as used by the encoder that produce the encoded data.

As used herein "input stream" refers to a source of data that may be provided to an encoding engine for encoding. The term input stream represents the various facilities that may provide the data to an encoding engine, such as, file streams, file handles, network sockets, Unix domain sockets, Windows sockets, pipes, named pipes, message queues, shared buffers, file mappings, databases, distributed data stores, or the like, or combination thereof. For example, an input stream may present data from a very large file or a document file that is provided to an encoding engine using operating system file input/output facilities. Or, the input stream could present data provided by a network socket connected to a remote data source. Herein, for brevity and clarity all sources of data provided to the encoding engine are referred to as input streams.

As used herein "encoded stream" refers to data that is both encoded and provided by an encoding engine. Similar to input streams above, encoded streams represent various facilities that provide encoded data, such as file streams, file handles, network sockets, Unix domain sockets, Windows sockets, pipes, named pipes, message queues, shared buffers, file mappings, databases, distributed data stores, or the like, or combination thereof. The encoding engine may produce the encoded stream and/or save the encoded data.

Herein, for brevity and clarity, encoded data produced by an encoding engine is referred to as an encoded stream. Note, encoded streams may include one or more un-encoded portions as described in detail below.

As used herein "output stream" refers to un-encoded data that may be provided by a decoding engine. Herein, for brevity and clarity all un-encoded data provided by a decoding engine are referred to as output streams. See, input stream above.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing data streams. In one or more of the various embodiments, if an input stream is provided to an encoding engine associated with one or more encoders, an encoded stream may be provided by encoding the input stream using the one or more encoders. In one or more of the various embodiments, if a request to insert a segment marker into the encoded stream is provided, segment marker information that includes at least a marker label may be provided. In one or more of the various embodiments the one or more encoders may be restored to an initial cryptographic state. Accordingly, in one or more of the various embodiments, one or more of electronic code books, buffered data, pipeline data, one or more counters, one or more cryptographic keys, one or more cryptographic certificates, one or more pseudo random numbers, one or more real random numbers, one or more timers that are associated with the one or more encoders, or the like.

In one or more of the various embodiments, an encoded segment may be provided by encoding the input stream using the one or more encoders, such that the encoded segment is included in the encoded stream.

In one or more of the various embodiments, encoding the input stream may include, selectively providing one or more un-encoded portions of the input stream based on messages provided by the application that provided the input stream and including the one or more un-encoded portions in the encoded stream.

In one or more of the various embodiments, if the encoding of the encoded segment is complete, segment metadata that is associated with the encoded stream may be updated to include one or more attributes that correspond to the encoded segment, such that the one or more attributes include at least the marker label, an offset position of the encoded segment within the encoded stream, and a size of the encoded segment.

In one or more of the various embodiments, if the encoded stream is provided to a decoding engine associated with one or more decoders, an output stream may be provided by decoding the encoded stream using the one or more decoders. in some embodiments, if un-encoded data is encountered while decoding the encoded stream, it may be included in the output stream.

And, in one or more of the various embodiments, if one or more encoded segments are encountered in the encoded stream: the one or more attributes that correspond to the one or more encoded segments may be provided; in one or more of the various embodiments, the one or more decoders may be restored to the initial cryptographic state; in one or more of the various embodiments, un-encoded data may be provided by decoding the one or more encoded segments using the one or more decoders and the one or more attributes; and the un-encoded data may be included in the output stream.

In one or more of the various embodiments, session information may be provided based on one or more cryptographic keys. And. in one or more of the various embodiments, the initial cryptographic state may be provided based on the session information and one of a beginning of the input stream, a beginning of the encoded stream, a beginning of the encoded segment, a beginning of a portion of the input stream that corresponds to the encoded segment, or the like.

In one or more of the various embodiments, if a segment marker query may be provided to the decoding engine, segment metadata entry may be provided based on the segment marker query. In one or more of the various embodiments, one or more attributes that correspond to one or more encoded segments may be provided based on the segment marker query, such that the one or more attributes that correspond to the one or more encoded segments may be provided from the segment metadata entry. In one or more of the various embodiments, the encoded stream may be searched to locate the one or more encoded segments based on the one or more attributes that correspond to the one or more encoded segments. And, the one or more encoded segments may be decoded.

In one or more of the various embodiments, if a request to insert the segment marker into an existing encoded segment is provided, the decoding engine may be employed to provide un-encoded data that corresponds to the existing encoded segment. In one or more of the various embodiments, a first encoded segment may be provided by encoding a first portion of the un-encoded data. In one or more of the various embodiments, a second encoded segment may be provided by encoding a second portion of the un-encoded data, such that the second encoded segment corresponds to the segment marker. And, in one or more of the various embodiments, the existing encoded segment may be overwritten by inserting the first encoded segment and the second encoded segment into the encoded stream.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, data coding server computer 116, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, data coding server computer 116, or other computers.

Client computers 102-105 may further be configured to include a client application that enables an end-user to log into an end-user account that may be managed by another computer, such as data coding server computer 116, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, or the like. Also, client computers may be arranged to enable users to display reports, interactive user-interfaces, and/or results provided by data coding server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, data coding server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of data coding server computer 116 is described in more detail below in conjunction with FIG. 3. Briefly, however, data coding server computer 116 includes virtually any network computer that is specialized to provide encoding and decoding services as described herein.

Although FIG. 1 illustrates data coding server computer 116 as a single computer, the innovations and/or embodiments are not so limited. For example, one or more functions of data coding server computer 116, or the like, may be distributed across one or more distinct network computers. Moreover, data coding server computer 116 is not limited to a particular configuration such as the one shown in FIG. 1. Thus, in one embodiment, data coding server computer 116 may be implemented using a plurality of network computers. In other embodiments, server computers may be implemented using a plurality of network computers in a cluster architecture, a peer-to-peer architecture, or the like. Further, in at least one of the various embodiments, data coding server computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
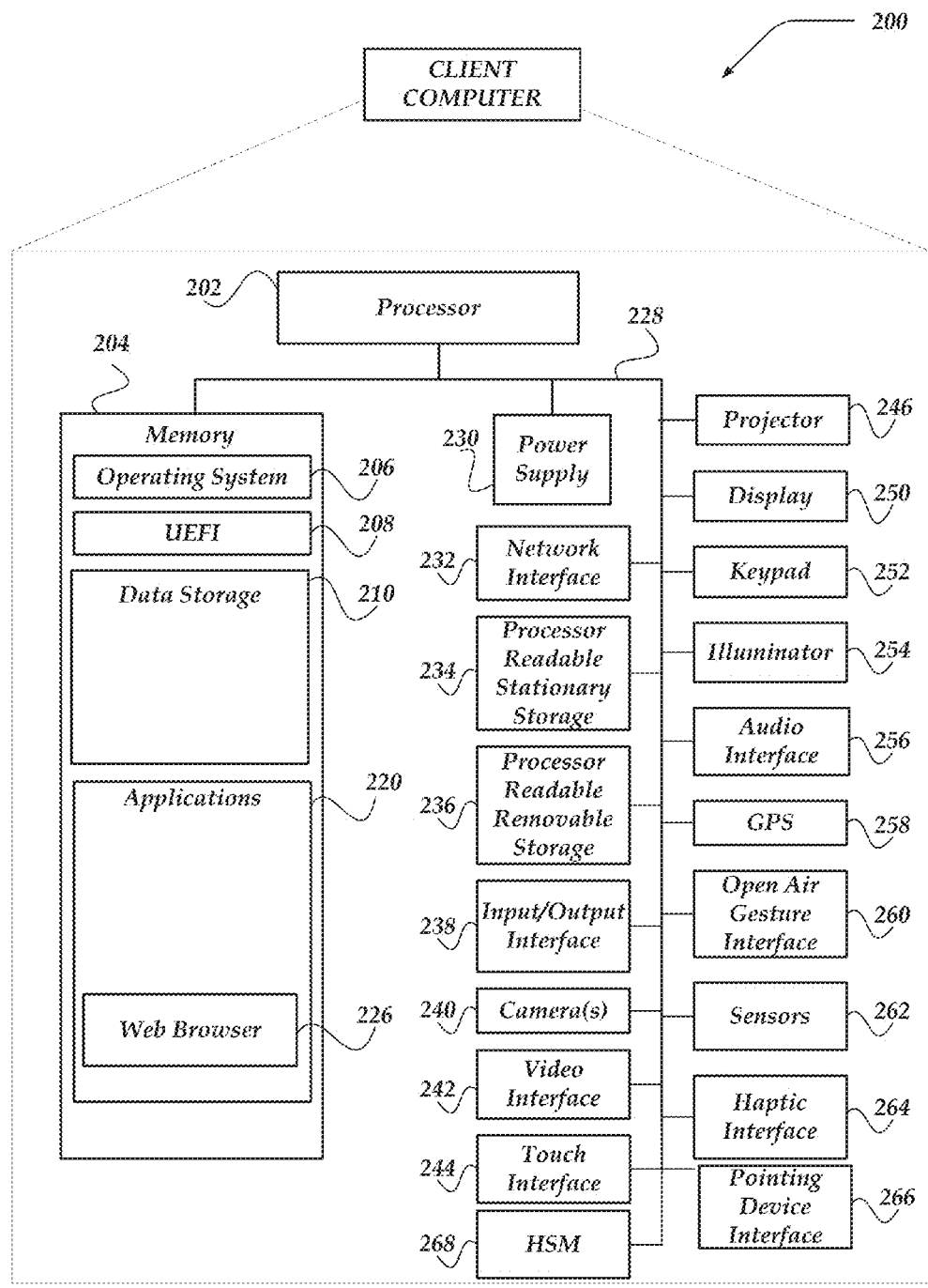
FIG. 2 shows an embodiment of a client computer that may be included in a system such as that shown in FIG. 1.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, flow execution engine 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Apple® IOS®, Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
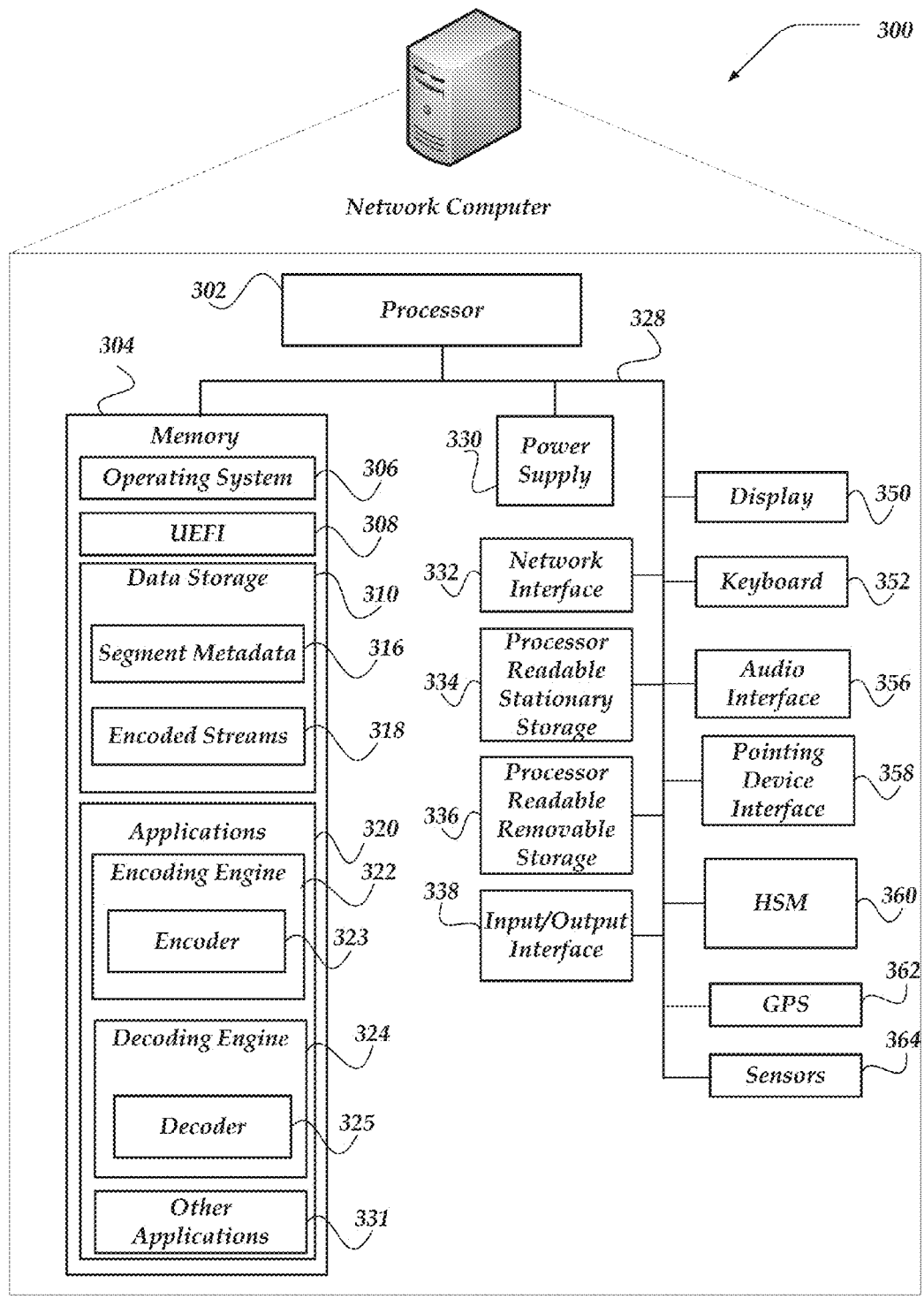
FIG. 3 shows an embodiment of a network computer that may be included in a system such as that shown in FIG. 1.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, segment metadata 316, encoded streams 318, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include encoding engine 322, decoding engine 324, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In one or more of the various embodiments, encoding engine 322 may include one or more encoders, such as encoder 323. And, in one or more of the various embodiments, decoding engine 324 may include one or more decoders, such as decoder 325. In some embodiments, encoding engine 322 and decoding engine 324 may be implemented in the same application. Likewise, in some embodiments, encoder 323 and decoder 325 may be implemented using the same software library or hardware processor.

In at least one of the various embodiments, applications, such as, encoding engine 322, decoding engine 324, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 and/or network 110.

Furthermore, in at least one of the various embodiments, encoding engine 322, decoding engine 324, other applications 331, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to encoding engine 322, decoding engine 324, other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

FIGS. 4A and 4B illustrates a logical schematic of system 400 that is arranged for providing markers for identifying portions of large-sized encoded documents in accordance with at least one of the various embodiments. In one or more of the various embodiments, a data coding server computer, such as data coding server computer 116 may be arranged to encode or decode data.

In some embodiments, the data coding server may be arranged to provide one or more segment markers that may enable users or applications to seek, identify or search for particular portions of the encoded data without having to decode the encoded payload/content of the encoded data. Further, in one or more of the various embodiments, if sequential encoding was used to encode the data, the segment markers may enable a sequential decoder to decode the encoded segment associated with a segment marker without having to decode the entire encoded file.

FIG. 4A illustrates a logical schematic showing that data coding server computer 402 may be provided an input stream, such as input stream 404 for encoding. In one or more of the various embodiments, data coding server computer 402 may encode input stream 404 to provide encoded stream 406. Accordingly, in one or more of the various embodiments, encoded stream 406 may be provided to another server or service for storage, or it may be stored local to data coding server computer 402.

In one or more of the various embodiments, data coding server computer 402 may be arranged to encode portions of input stream 404 while leaving other portions of input stream 406 un-encoded. Accordingly, in one or more of the various embodiments, encoded segment 408 and encoded segment 410 represent encoded portions of encoded stream 406. In some embodiments, these segments may be encoded by an encoder engine, such as encoder engine 322 (in FIG. 3), or the like. As described above, the encoding may include encryption, compression, or the like, or combination thereof.

In one or more of the various embodiments, segment markers may be inserted in the encoded stream to demark the encoded segments. Further, the encoding engine may provide segment metadata that corresponds to some or all of the encoded segments.

In one or more of the various embodiments, the encoding engine may be arranged to enable external applications (e.g., external to the encoding engine) to trigger if or when segment markers may be injected to the encoded stream. Thus, in some embodiments, the particular portions of input stream 404 that are encoded may be selected by the external applications.

In one or more of the various embodiments, the encoding engine may be arranged to automatically inject segment markers according to one or more rules or configurations.

FIG. 4B illustrates a logical schematic showing that data coding server computer 402 may be provided an encoded stream, such as encoded stream 406 for decoding. Accordingly, in one or more of the various embodiments, a decoding engine, such as decoding engine 324 may be arranged to decode encoded stream 406 to provide output stream 412.

In one or more of the various embodiments, decoding engine 324 may be arranged to recognize encoded segments, such as encoded segment 408 and encoded segment 410. Accordingly, in some embodiments, decoding engine 324 may be arranged to decode the encoded segments and pass through the non-encoded portions of encoded stream 406.

In one or more of the various embodiments, an entire stream may be encoded with only certain portions marked or labeled using segment markers. Thus, in some embodiments, there may not be any un-encoded portions of an encoded stream. In some embodiments, the encoded portions that are not explicitly in a marked segment may be considered special marked segments where the encoding engine inserts unlabeled segment markers to separate labeled segments from unlabeled portions of an encoded stream.

Figure 5A:
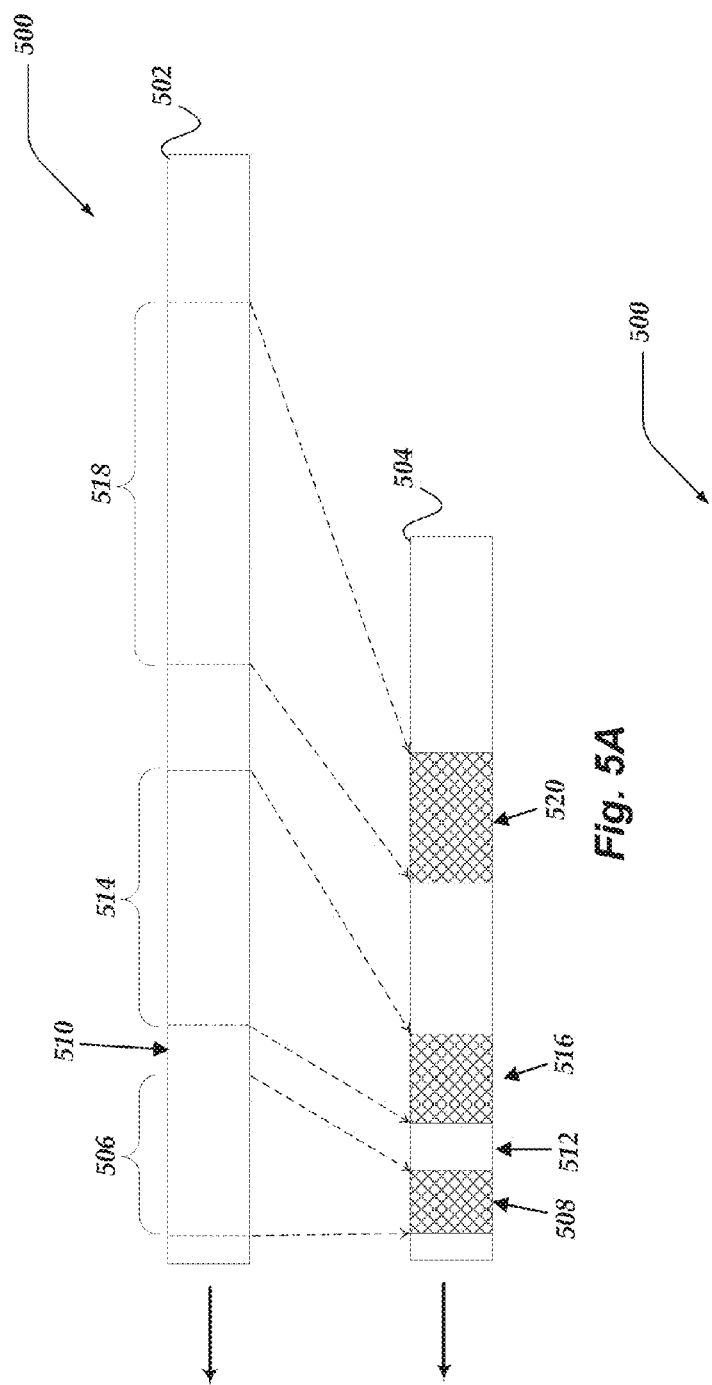
FIG. 5A illustrates a logical schematic of a portion of a system that is arranged for providing markers for identifying portions of large-sized encoded documents in accordance with at least one of the various embodiments.

FIG. 5A illustrates a logical schematic of a portion of system 500 that is arranged for providing markers for identifying portions of large-sized encoded documents in accordance with at least one of the various embodiments. FIG. 5A shows additional detail about encoded streams, encoded segments, segment markers, and so on.

In one or more of the various embodiments, input stream 502 represents an un-encoded stream of data that may be provided to an encoding engine, such as encoding engine 322. In some embodiments, input stream 502 may be a stream such that it may be a real-time stream or it may be a file stream.

In one or more of the various embodiments, encoded stream 504 represents an encoded stream that may be provided by an encoding engine, such as encoding engine 322. In this example, encoded stream includes three marked encoded segments. Accordingly, input stream portion 506 corresponds to encoded segment 508. Likewise, in this example, input stream portion 510 corresponds to encoded stream portion 512. In this example, input stream portion 510 may be designated such that it may be unlabeled or unmarked data that may be encoded or un-encoded. Likewise, the unreferenced portions of input stream 502 and encoded stream 504 may be considered to be unlabeled or unmarked stream portions that may be encoded or un-encoded. However, in this example, they may be considered to unmarked or unlabeled stream portions.

Further, in this example: input stream portion 514 corresponds to encoded segment 516; and input stream portion 518 corresponds to encoded segment 520.

Figure 5B:
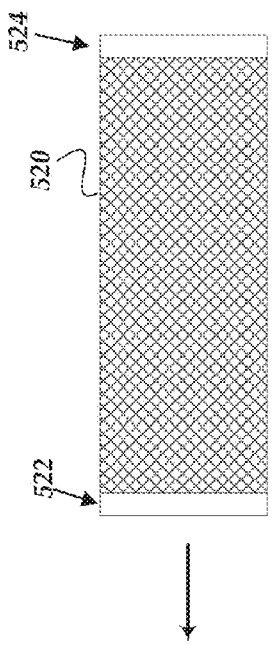
FIG. 5B illustrates a logical schematic of a portion of a system that is arranged for providing markers for identifying portions of large-sized encoded documents in accordance with at least one of the various embodiments.

FIG. 5B illustrates a logical schematic of a portion of system 500 that is arranged for providing markers for identifying portions of large-sized encoded documents in accordance with at least one of the various embodiments. FIG. 5B shows additional detail about encoded segments, and segment markers. In this example, encoded segment 520 is shown with additional detail of segment marker 522 and segment marker 524. In one or more of the various embodiments, segment markers, such as segment marker 522 and segment marker 524 serve as boundaries for encoded segment 520. Accordingly, in one or more of the various embodiments, a decoding engine may discover the segment markers during decoding and respond appropriately.

In one or more of the various embodiments, if an encoding engine is about to start a next encoded segment it may be arranged to reset its cryptographic state to the initial or start state. For example, this may involve clearing the current ECBs, or the like, and then generating initial state ECBs using known predetermined keying material. Note, in some embodiments, the encoder may be arranged to overwrite a previous cryptographic state with the initial state information rather than "clearing" the state information. Note, the particular encoder used by the encoding engine will control the details of how to establish an initial cryptographic state. In some cases, the encoder may be an external service or library that provides an API for triggering a reset to restore the encoder to an initial state.

In one or more of the various embodiments, the encoder may be a non-sequential encoder or it may otherwise not be configured to use a sequential cipher. Accordingly, for non-sequential encoders the segment markers may not trigger a reset to initial state since it may be unnecessary.

In one or more of the various embodiments, segment markers, such as segment marker 522 may be associated with arbitrary labels or tag information that may be discovered without decoded and encoded stream. In one or more of the various embodiments, applications that trigger the insertion of segment markers may provide label information that may be associated with the segment markers. In one or more of the various embodiments, there may be one or more reserved labels that may be reserved for segment markers provided automatically by the encoding engine.

In one or more of the various embodiments, the label information may be embedded in the encoded stream with the marker. In some embodiments, the label information may be kept in a separate segment metadata file and referenced using an index value or other shortened identifier.

In one or more of the various embodiments, encoding engines may include closing segment markers such as segment marker 524 that may be used for indicating the end of an encoded segment. Accordingly, in one or more of the various embodiments, a decoding engine may be arranged to discover encoded segment based on a start segment marker, such as segment marker 522 and discover the end of an encoded segment based on its closing segment marker, such as segment marker 524. In some embodiments, the closing segment marker may be omitted.

In one or more of the various embodiments, if an encoding engine finishes encoding an encoded segment it may be arranged to provide additional segment information that is associated with the segment and store it in segment metadata (not shown here, see FIG. 7), such as those that may be stored in segment metadata 316. In one or more of the various embodiments, the segment information may include information that may be sufficient for a decoding engine, such as decoding engine 326 to discover the segment and decode it correctly.

In one or more of the various embodiments, segment information may include various data fields, such as, segment label, starting offset position within the encoded stream, encoded data size, un-encoded data size, or the like.

Figure 6A:
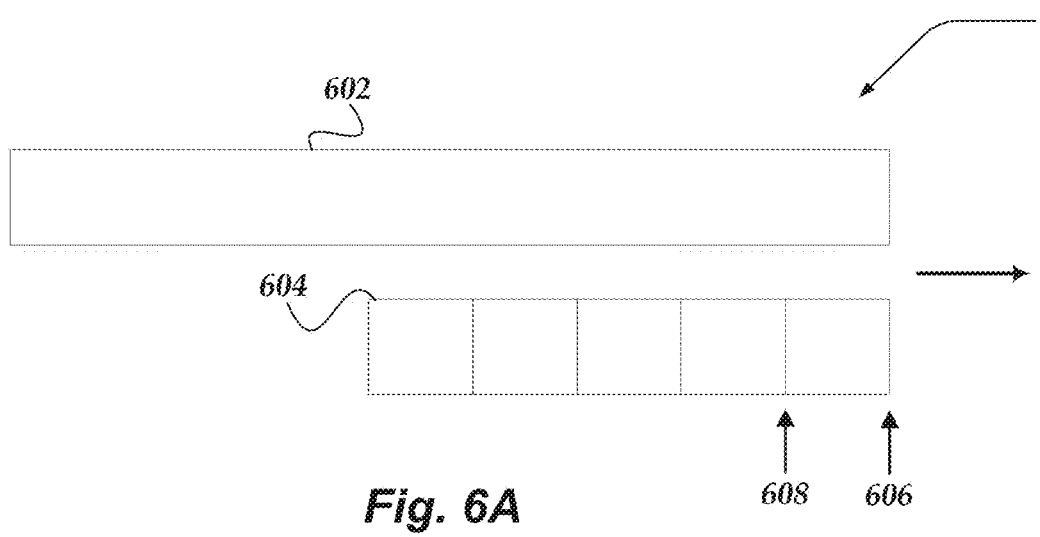
FIG. 6A illustrates a logical schematic of a portion of a system that is arranged for providing markers for identifying portions of large-sized encoded documents in accordance with at least one of the various embodiments.
Figure 6B:
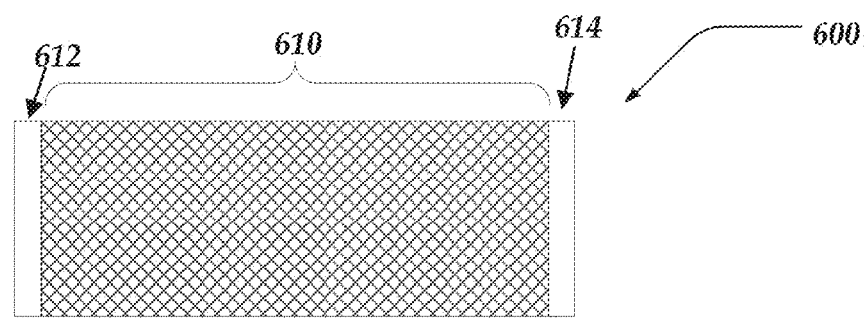
FIG. 6B illustrates a logical schematic of a portion of a system that is arranged for providing markers for identifying portions of large-sized encoded documents in accordance with at least one of the various embodiments.
Figure 6C:
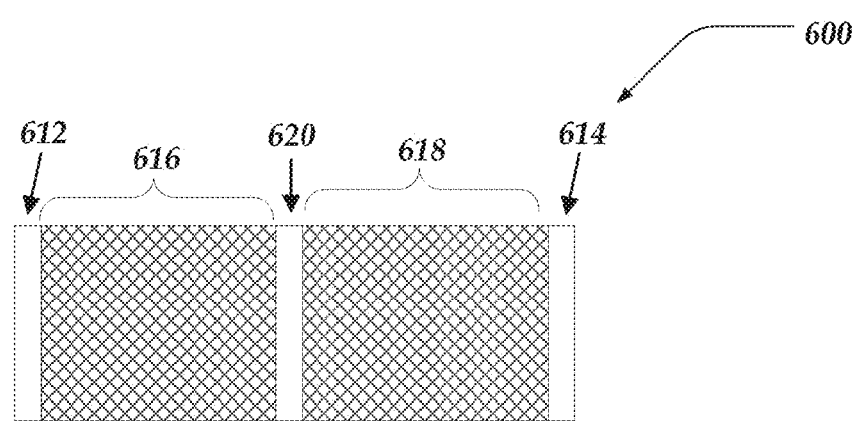
FIG. 6C illustrates a logical schematic of a portion of a system that is arranged for providing markers for identifying portions of large-sized encoded documents in accordance with at least one of the various embodiments.

FIGS. 6A-6C show additional detail about encoded streams, encoded segments, and segment markers, and so on, FIG. 6A illustrates a logical schematic of a portion of system 600 that is arranged for providing markers for identifying portions of large-sized encoded documents in accordance with at least one of the various embodiments. In one or more of the various embodiments, an input stream such as input stream 602 may be provided to an encoding engine, such as encoding engine 322. Accordingly, the encoding engine may be arranged to provide encoded stream 604.

In one or more of the various embodiments, encoding engines may be arranged to automatically insert segment markers (and encoded segment) into an encoded stream. For example, the encoding engine may be configured to insert a segment marker for every 64 KB of the input stream. In other embodiments, the encoding engine may be arranged to insert a segment marker each second to act as a timestamp. In this example, segment marker 606 and segment marker 608 may represent segment markers that may have been automatically insert into encoded stream 604.

FIG. 6B illustrates a logical schematic of a portion of system 600 that is arranged for providing markers for identifying portions of large-sized encoded documents in accordance with at least one of the various embodiments. In one or more of the various embodiments, encoded segment 610 may be part of an encoded stream. In some embodiments, segment marker 612 may be a segment marker at the beginning of encoded segment 610. And, in some embodiments, segment marker 614 may represent a closing segment marker or the segment marker for the next encoded segment.

In one or more of the various embodiments, during encoding if a segment marker is being inserted, the encoding engine may be arranged to reset the encoder to an initial cryptographic state before producing encoded segment 610. Thus, in this example, if the encoder is a sequential encoder, the encoding of encoded segment 610 may be sequentially dependent on the first byte of the encoded segment. Accordingly, to decode the segment completely and correctly, the decoder may be arranged to reset itself to the initial cryptographic state to decode the contents of encoded segment 610. For example, assuming sequential encoding, if encoded segment 610 corresponds to 64 KB (or other configurable segment size) of the input stream (not shown), the bytes of encoded data starting at the beginning of the segment (just after segment marker 612) must be decoded in sequential order to successfully decode the last bytes of the segment (just before segment marker 614). Decoding out of order or starting from the someplace other than the beginning of encoded segment 610 will produce incorrect results. Note, in some embodiments, if the encoder may be using non-sequential encoding, there may be conditions that enable portions of the segment to be decoded out-of-order.

FIG. 6C illustrates a logical schematic of a portion of system 600 that is arranged for providing markers for identifying portions of large-sized encoded documents in accordance with at least one of the various embodiments. In one or more of the various embodiments, an encoding engine may be arranged to insert one or more segment markers into an encoded stream that already includes encoded segments. Or, in some embodiments, the encoding engine may be arranged to insert a segment marker inside of an encoded segment.

For example, in some embodiments, an encoding engine may be arranged or configured to automatically insert segment markers into the encoded stream every 64 KB (or other configurable segment size) of the input stream. Accordingly, in some embodiments, an application or a user can insert their own application specific segment marker into the encoded stream and even coexist with an encoded segment already defined by the automatically inserted segment markers.

In another example, in some embodiments, an application may request to insert a new segment marker into a previously generated encoded stream that already includes one or more encoded segments. Accordingly, in one or more of the various embodiments, the encoding engine may insert the new segment marker into an existing encoded segment.

Accordingly, in one or more of the various embodiments, if a segment marker may be inserted into an encoded segment, during the encoding of the stream, the current encoded segment may be ended and closed before the new segment marker is inserted. Thus, in one or more of the various embodiments, the encoding engine may insert the new marker and reset its encoder to its initial cryptographic state. The remainder of the segment may be encoded starting at the position of the new marker.

In one or more of the various embodiments, if the encoded stream was previously generated, adding the new segment marker may be more complicated. In some embodiments, the decoding engine may locate the segment markers that enclose the encoded segment where the new segment marker may be added. Accordingly, the decoding engine may decode the entire segment and provide the entire decoded segment to the encoding engine. The encoding engine may then encode the first part of the segment, insert the new segment marker, and encode the second part of the segment.

For example, in some embodiments, encoded segment 616 and encoded segment 618 represent a view of how encoded segment 610 may be modified if an additional segment marker, such as segment marker 620 may be added to the encoded stream. Here, in this example, the new segment marker, segment marker 620 effectively divides the formerly encoded segment 610 into two segments, encoded segment 616 and encoded segment 618. Note, this example also represents the outcome of the case where the encoding engine may be configured to insert segment markers at every 64 KB (or other configurable segment size) of the input stream. At least one difference between on-the-fly generation and modifying a previously generated encoded stream is that the two encoded segments (e.g., encoded segment 616 and encoded segment 618) may be generated on-the-fly by the encoding engine without the need to decode the formerly encoded segment 610.

In one or more of the various embodiments, if a previously generated encoded stream is being modified by inserting additional segment markers, the segment metadata for the encoded stream may need to be updated to reflect changes. In one or more of the various embodiments, if an additional segment marker was added, the segment metadata may be updated to include the new segment marker and its associated information.

Likewise, in some embodiments, adding a new segment marker to the segment metadata may require the encoding engine to "fixup" the metadata entries for markers that come after the modified/added segments. In one or more of the various embodiments, if the modifications result in the affected encoded segments to change size, the offset values of the encoded segments that come after the modifications may require correcting. For example, for some embodiments, if encoded segment 610 is 64 KB, the next encoded segment will begin +64 KB (assuming offset in terms of bytes) after the start of segment 610. Continuing with this example, since the addition of segment marker 620 generates segment 616 and segment 618, if the sum of their sizes is not equal to 64 KB the offset values (possibly stored in the encoded stream's segment metadata) for subsequent segments in the encoded stream may require updating/correcting.

In one or more of the various embodiments, if a modification results in smaller encoded segments, the encoding engine may be arranged to add null padding to the modified encoded segments (e.g., segment 616 or segment 618) to avoid requiring offset updates to the segment metadata. However, if the modifications increase the size(s), the offset value for subsequent encoded segment in an existing encoded stream may be updated to reflect the shift caused by the change in size.

Figure 7:
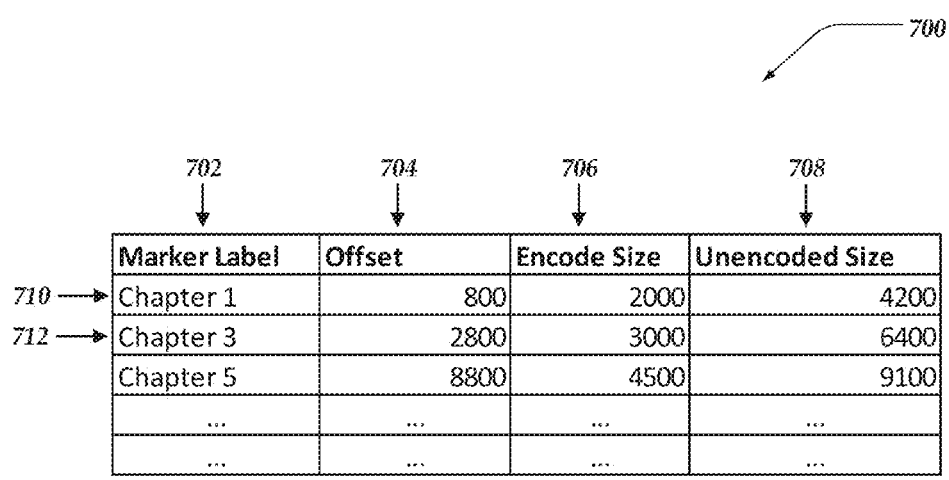
FIG. 7 illustrates a logical schematic of a portion of segment metadata for storing metadata and segment markers information for identifying portions of large-sized encoded documents in accordance with at least one of the various embodiments.

FIG. 7 illustrates a logical schematic of a portion of segment metadata 700 for storing segment markers information for identifying portions of large-sized encoded documents in accordance with at least one of the various embodiments. In one or more of the various embodiments, segment metadata, such as segment metadata 700 include information that supports fast lookups of encoded segments in an encoded stream (e.g. encoded document). In one or more of the various embodiments, segment metadata may be data structures that include marker information for each segment marker.

In one or more of the various embodiments, segment metadata may be arranged to be extensible data structures that enable one or more additional fields or custom fields to the included in segment metadata. For example, in some embodiments, one or more fields of segment metadata may be compound fields that may be arranged to include one or more named value pairs, or the like.

In one or more of the various embodiments, segment metadata, such as segment metadata 700 may include one or more fields, such as marker label 702, offset 704, encoded size 708, un-encoded size, or the like. For example, in some embodiments, in row 710 the marker information includes a marker label set to "Chapter 1", an offset value of 800, encoded size of 2000 bytes, and an un-encoded size of 4200 bytes. Likewise, for example, in row 712 the marker information includes a marker label set to "Chapter 3", an offset value of 2800, encoded size of 3000 bytes, and an un-encoded size of 6400 bytes.

In one or more of the various embodiments, the marker label may be an arbitrary string value. In some embodiments, the encoding engine may be arranged to employ configuration information to enforce one or more constraints, such as maximum string length, one or more special or excluded characters, one or more reserved words, or the like, or combination thereof.

In one or more of the various embodiments, applications that the use the encoding engine may provide a label value when requesting to add segment markers. Accordingly, in some embodiments, except for the constraints discussed above, the encoding engine sets the label value as requested.

In one or more of the various embodiments, the offset value indicates the starting location of the encoded segment within the encoded stream. Accordingly, in some embodiments, the decoding engine may use the offset value to determine where to seek within the encoded stream to locate a particular encoded segment. In one or more of the various embodiments, the offset value may be computed by the encoding engine after the segment is encoded and closed. In one or more of the various embodiments, the offset value may be computed or recorded in terms of bytes, words, blocks, or the like.

In one or more of the various embodiments, the encoded size value indicates the size of the encoded segment in terms of space used in storage media or memory (e.g., bytes, words, blocks, or the like). Likewise, in one or more of the various embodiments, un-encoded size indicates the size of the segment before it was encoded.

In one or more of the various embodiments, segment metadata may be maintained separate from the encoded stream. In some embodiments, segment metadata may be pre-pended or appended to its associated encoded stream. Further, in some embodiments, the segment metadata information may be embedded directly with the segment marker. Still further, in some embodiments, the segment metadata information may be both embedded with the segment markers and stored separately.

In one or more of the various embodiments, the segment metadata may be implemented using various data structures or formats, such as database tables, arrays, trees, XML files, JSON files, or the like, or combination thereof.

Generalized Operations

FIGS. 8-12 represent the generalized operations for marking, identifying, encoding, and decoding sequential or independent segment portions of large-sized documents in accordance with at least one of the various embodiments. In one or more of the various embodiments, processes 900, 1000, 1100, and 1200 described in conjunction with FIGS. 8-12 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 8-12 may be for marking, identifying, encoding, and decoding sequential or independent segment portions of large-sized documents such as described in conjunction with FIGS. 4-7.

Figure 8:
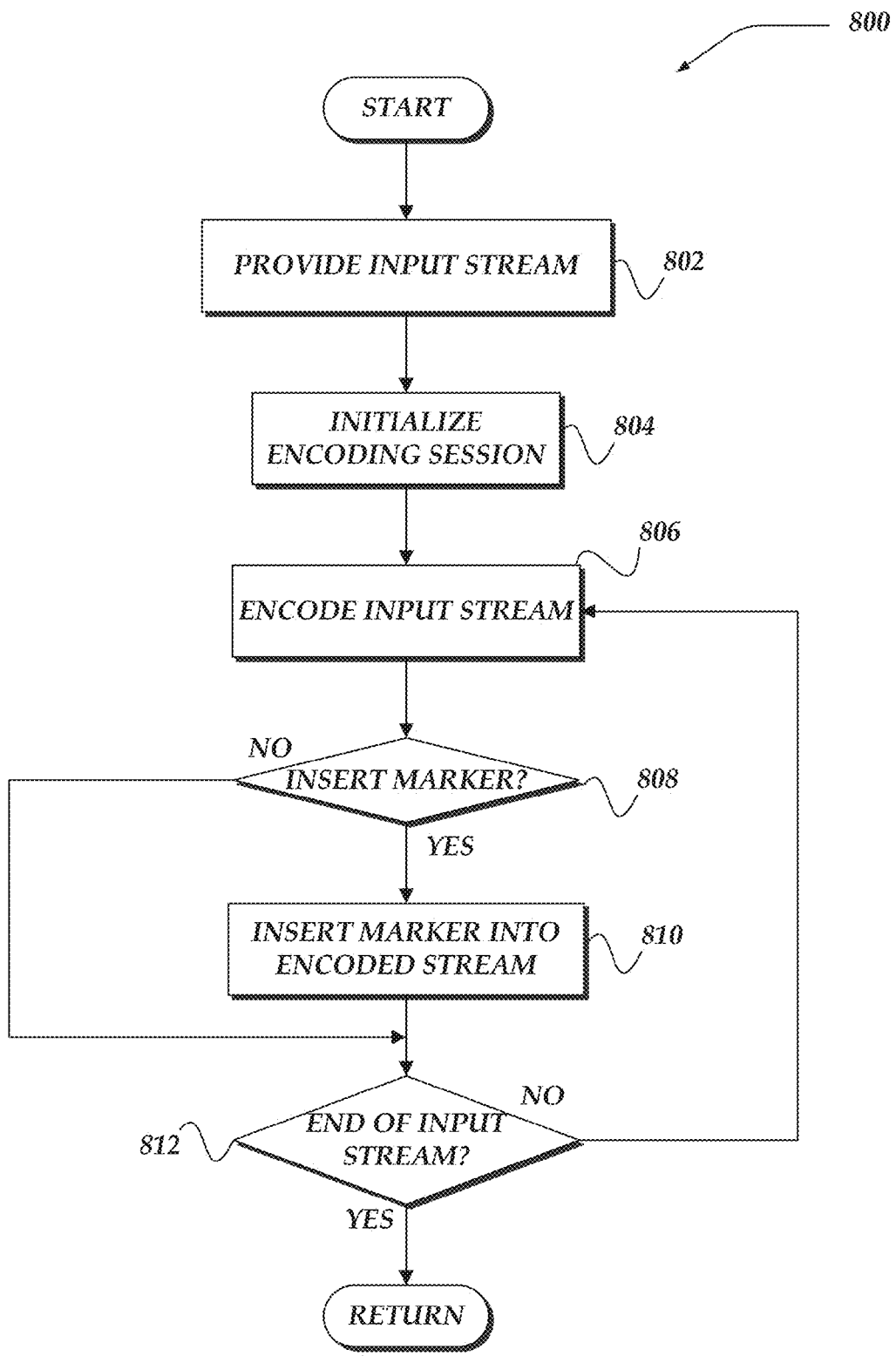
FIG. 8 illustrates an overview flowchart for a process for marking and encoding sequential segments within large-sized documents in accordance with one or more of the various embodiments.

FIG. 8 illustrates an overview flowchart for process 800 for marking and encoding sequential segments within large-sized documents in accordance with one or more of the various embodiments. After a start block, at block 802, in one or more of the various embodiments, an input stream may be provided to an encoding engine, such as encoding engine 322. In one or more of the various embodiments, the encoding engine may be arranged to accept input streams that may be provided by one or more applications or services that may be arranged to encode data for one or more application specific reasons. In one or more of the various embodiments, the encoding engine may be unaware of the context or purpose of the encoding. Accordingly, the encoding engine may be considered a service that may be used by various applications.

At block 804, in one or more of the various embodiments, the encoding engine may initialize an encoding session. In one or more of the various embodiments, the encoding engine may be arranged to perform one or more operations to initialize an encoding session. In some embodiments, the required initialization operations may depend on the encoder and/or cipher suites being used. For example, initialization operations may include obtaining one or more cryptographic keys from a key escrow, obtain keying information from the client application, collecting user input (e.g., passphrases, biometrics, or the like), or the like, or combination thereof. Accordingly, in one or more of the various embodiments, the encoding engine may be enabled to provide an encoded stream that may be decoded by facilities that have access to the proper keys, keying information, user input, or the like.

Also, in one or more of the various embodiments, the initialization the encoding session may include initializing the cryptographic state of the encoder. In some embodiments, the encoder may be initialized using some or all of the cryptographic credentials used or provided for initialization.

One of ordinary skill in the art will appreciate that the particular initialization operations performed and the particular cryptographic credentials that are required may depend on the encoder, encoding engine configuration (e.g., key strength requirements, or the like), cipher suite, or the like. Accordingly, since the initialization requirements will be well-known for a given embodiment, for brevity and clarity those details are omitted herein.

At block 806, in one or more of the various embodiments, the encoding engine may begin encoding the input stream. In one or more of the various embodiments, the encoding engine may be arranged to employ an encoder to encode the un-encoded data provided via the input stream. As described above, as data provided by the input stream is encoded it may be added or provided to an encoded stream produced by the encoding engine.

At decision block 808, in one or more of the various embodiments, if a segment marker should be inserted into the encoded stream, control may flow to block 810; otherwise, control may jump to decision block 812. In one or more of the various embodiments, the encoding engine may be arranged to provide one or more APIs that enable client applications to request that a segment marker be inserted into the encoded stream. The request may include parameters, such as marker label, marker size (in terms of un-encoded data input stream), or the like.

In one or more of the various embodiments, the encoding engine may be arranged or configured to automatically insert segment markers if one or more configured condition are met. For example, in some embodiments, the encoding engine may be configured to insert a segment marker into the encoded stream for every 64 KB (or other configurable segment size) of un-encoded data provided from the input stream, or the like.

At block 810, in one or more of the various embodiments, the encoding engine may insert the segment marker into to encoded stream. In one or more of the various embodiments, the encoding engine may be arranged to execute operations for inserting the segment marker into the encoded stream. As described on more detail below, inserting the segment marker may result in an encoded segment and an update to segment metadata that may be associated with the encoded stream.

At decision block 812, in one or more of the various embodiments, if the end of the input stream is reached, control may be returned to a calling process; otherwise, control may loop back to block 806. In one or more of the various embodiments, the encoding engine may be arranged to continue encoding data from the input stream until the stream terminates or the encoding engine is otherwise directed to stop encoding. For example, in some embodiments, a client application may send a message using an API to terminate the encoding operation.

Figure 9:
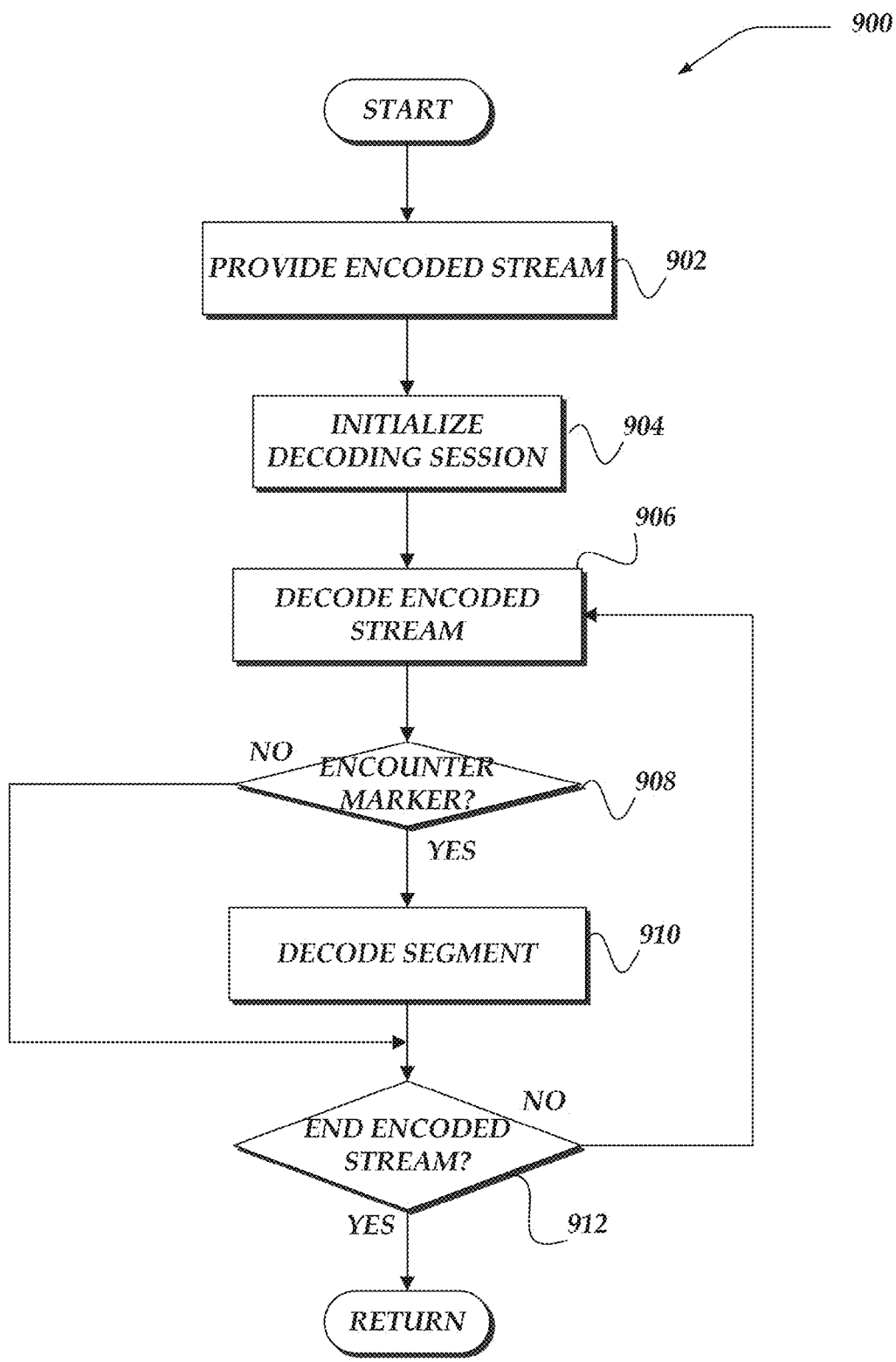
FIG. 9 illustrates an overview flowchart for a process for identifying and decoding sequential segments within large-sized documents in accordance with one or more of the various embodiments.

FIG. 9 illustrates an overview flowchart for process 900 for identifying and decoding sequential segments within large-sized documents in accordance with one or more of the various embodiments. After a start block, at block 902, in one or more of the various embodiments, an encoded stream may be provided to a decoding engine, such as decoding engine 324. In one or more of the various embodiments, the decoding engine may be arranged to accept encoded streams that may be provided by one or more applications or services that may be arranged to require encode data be decoded for one or more application specific reasons. In one or more of the various embodiments, the decoding engine may be unaware of the context or purpose of the decoding. Accordingly, the decoding engine may be considered a service that may be used by various applications.

At block 904, in one or more of the various embodiments, the decoding engine may initialize a decoding session. In one or more of the various embodiments, the decoding engine may be arranged to perform one or more operations to initialize a decoding session. In some embodiments, the required initialization operations may depend on the decoder and/or cipher suites being used. For example, initialization operations may include obtaining one or more cryptographic keys from a key escrow, obtain keying information from the client application, collecting user input (e.g., passphrases, biometrics, or the like), or the like, or combination thereof. Accordingly, in one or more of the various embodiments, the decoding engine may be enabled to provide an output stream to one or more applications that may provide the proper keys, keying information, user input, or the like.

Also, in one or more of the various embodiments, initialization of the decoding session may include initializing the cryptographic state of the decoder. In some embodiments, the decoder may be initialized using some or all of the cryptographic credentials used or provided for initialization.

One of ordinary skill in the art will appreciate that the particular initialization operations performed and the particular cryptographic credentials that are required may depend on the decoder, decoding engine configuration (e.g., key strength requirements, or the like), cipher suite, or the like. Accordingly, since the initialization requirements will be well-known for a given embodiment, for brevity and clarity those details are omitted herein.

At block 906, in one or more of the various embodiments, the decoding engine may decode the encoded stream. In one or more of the various embodiments, the decoding engine may be arranged to employ a decoder to decode the encoded data provided via the encoded stream. As described above, as data provided by the encoded stream is decoded it may be added or provided to an output stream produced by the decoding engine.

At decision block 908, in one or more of the various embodiments, if a segment marker is encountered, control may flow to block 910; otherwise, control may jump to decision block 912. In one or more of the various embodiments, the decoding engine may be arranged to identify segment markers that may be included in the encoded stream. In some cases, the segment markers may be identified based on "magic string" or codes embedded in the encoded stream. In other embodiments, the decoding engine may refer segment metadata that may be associated with the encoded stream that is being decoded.

At block 910, in one or more of the various embodiments, the decoding engine may decode the encoded segment. In one or more of the various embodiments, the decoding engine may be arranged to decode the encoded segment and provide the un-encoded to the output stream.

At decision block 912, in one or more of the various embodiments, if the encoded stream is finished, control may be returned to a calling process; otherwise, control may loop back to block 906. In one or more of the various embodiments, the decoding engine may be arranged to continue decoding data from the encoded stream until the stream terminates or the decoding engine is otherwise directed to stop decoding. For example, in some embodiments, a client application may send a message using an API to terminate the decoding operation.

Figure 10:
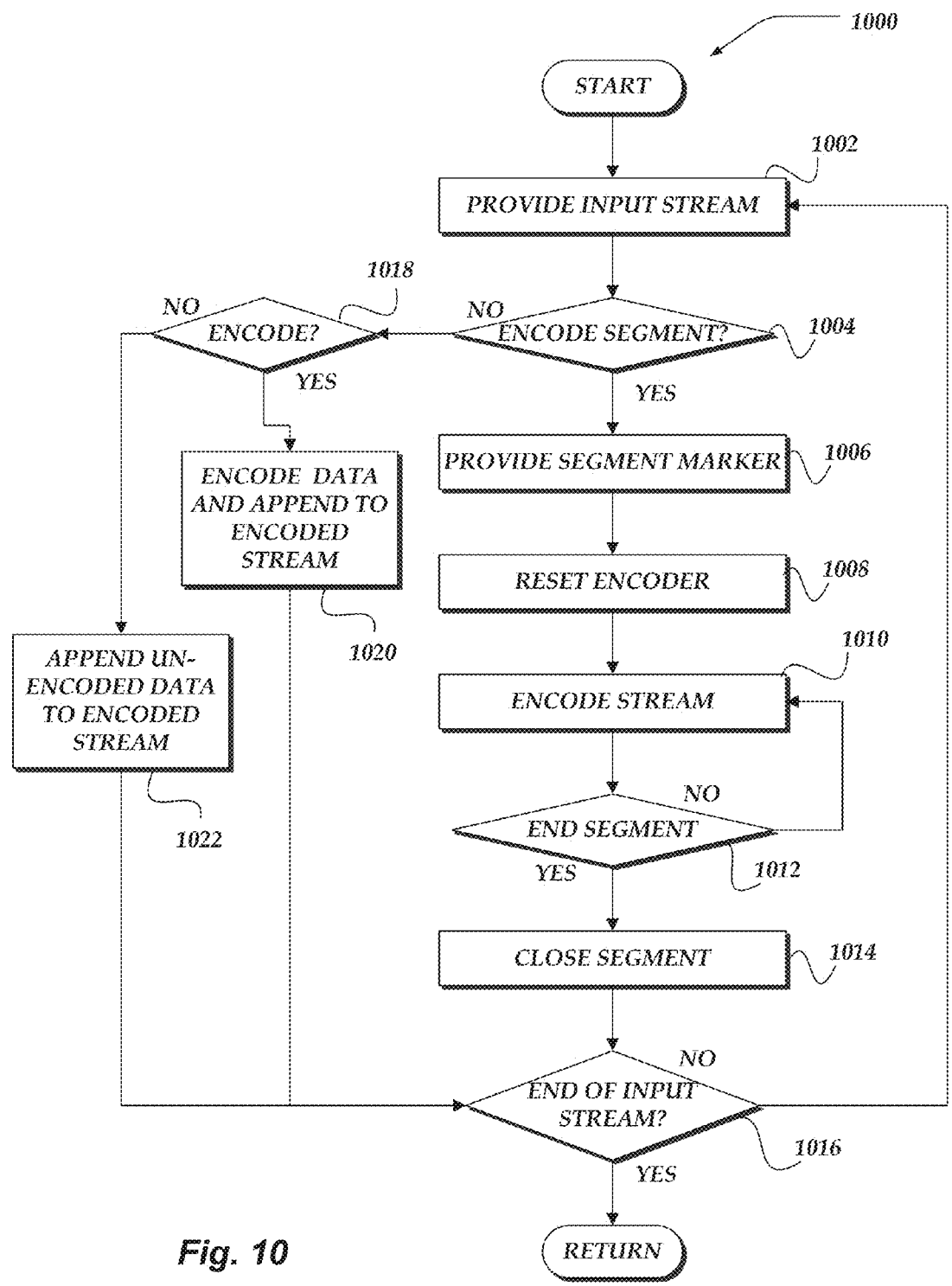
FIG. 10 illustrates a flowchart for a process for marking and encoding independent segments within large-sized documents in accordance with one or more of the various embodiments.

FIG. 10 illustrates a flowchart for process 1000 for marking and encoding independent segments within large-sized documents in accordance with one or more of the various embodiments. After a start block, at block 1002, in one or more of the various embodiments, an input stream may be provided to an encoding engine, such as encoding engine 322. See, block 802 for more details. Further, in one or more of the various embodiments, process 1000 may be considered to occur after the encoding session has been initialized. See, block 804 for more description about session initialization.

At decision block 1004, in one or more of the various embodiments, if a segment should be encoded, control may flow to block 1006; otherwise, control may flow to decision block 1018. In one or more of the various embodiments, the encoding engine may be arranged to accept requests from client applications (e.g., clients of the encoding engine) to insert segment markers into the current encoded stream. In some embodiments, request may be provided using one or more API. Also, in some embodiments, the encoding engine may be arranged to automatically insert segment markets based on various conditions or configuration rules.

At block 1006, in one or more of the various embodiments, the encoding engine may provide a segment marker. In one or more of the various embodiments, the segment marker may be comprised of various information, such as, marker labels, starting offset value, or the like. In some embodiments, the segment marker may include an identifiable tag that may be inserted into the current encoded stream.

At block 1008, in one or more of the various embodiments, the encoding engine may reset its encoder. In one or more of the various embodiments, the encoding engine may be arranged to reset its encoder to an initial cryptographic state. As described above, this may include resetting one or more encoder components, such as electronic code books (ECBs), or the like, as described above. In one or more of the various embodiments, if sequential encoding is being used, resetting the encoder puts it back to a known starting state that may be based on the initialization parameters or initialization credentials.

At block 1010, in one or more of the various embodiments, the encoding engine may encode the input stream. In one or more of the various embodiments, the encoding engine may be arranged to encode the input stream. As usual, in some embodiments, the encoded data may be added to the encoded stream.

At decision block 1012, in one or more of the various embodiments, if the segment should end, control may flow to block 1014; otherwise, control may loop back to block 1010. In one or more of the various embodiments, the encoding engine may be arranged to continue encoding the data for the encoded segment until one or more termination conditions may be met. In one or more of the various embodiments, the client application that triggered the insertion of the segment marker may provide a size or count value that if reached signals the end of the segment. For example, in some embodiments, if a request for a segment marker is made, it may include a value representing a size limit for segment in terms of the number of bytes (e.g., bits, words, kilobytes, or the like) to encode before ending the segment. The number of size limit may be computed based on the input stream size.

Also, in one or more of the various embodiments, the client application may send a message (e.g., via an API) to terminate the segment.

At block 1014, in one or more of the various embodiments, the encoding engine may close the segment. In one or more of the various embodiments, since the encoded segment has reached its end, the encoding engine may be arranged to perform the various cleanup operations to close the encoded segment. In one or more of the various embodiments, the encoding engine may update the segment metadata to include the new encoded segment information by adding segment information such as marker labels, offset position, encoded size, un-encoded size, or the like.

At decision block 1016, in one or more of the various embodiments, if the end of the input stream is reached, control may be returned to a calling process; otherwise, control may loop back to block 1002. In one or more of the various embodiments, the encoding engine may be arranged to continue encoding data from the input stream until the stream terminates or the encoding engine is otherwise directed to stop encoding. For example, in some embodiments, a client application may send a message using an API to terminate the encoding operation.

At decision block 1018, in one or more of the various embodiments, if the input stream should be encoded, control may flow to block 1020; otherwise, control may flow to block 1022. In one or more of the various embodiments, the encoding engine may be configured or directed to encode the input stream even if it is not encoding encoded segment. For example, in some embodiments, an application may request that the entire input stream be encoded notwithstanding the number of segment markers that may be inserted. In contrast, FIGS. 4A, 4B, 5A, and 5B show encoded streams that appear to only encode the contents of the encoded segments. In one or more of the various embodiments, the entire stream may be encoded depending on the client application.

At block 1020, in one or more of the various embodiments, the encoding engine may encode the input stream. In one or more of the various embodiments, the encoding engine may be arranged to encode the input stream. As usual, in some embodiments, the encoded data may be added to the encoded stream. Next, control may flow to decision block 1016.

At block 1022, in one or more of the various embodiments, the encoding engine may append the un-encoded stream data to the encoded stream. In one or more of the various embodiments, the encoding engine may be configured to pass some input stream data through without encoding. For example, in some embodiments, applications may be arranged to encode portions of the input stream while leaving the remained un-encoded. For example, in some embodiments, the input stream may be comprised of data packets that include header information and payload information. Accordingly, for example, the application may request that the header information portions of the input stream remain un-encoded while the payload portions are encoded (e.g., as encoded segments). Next, control may flow to decision block 1016.

Figure 11:
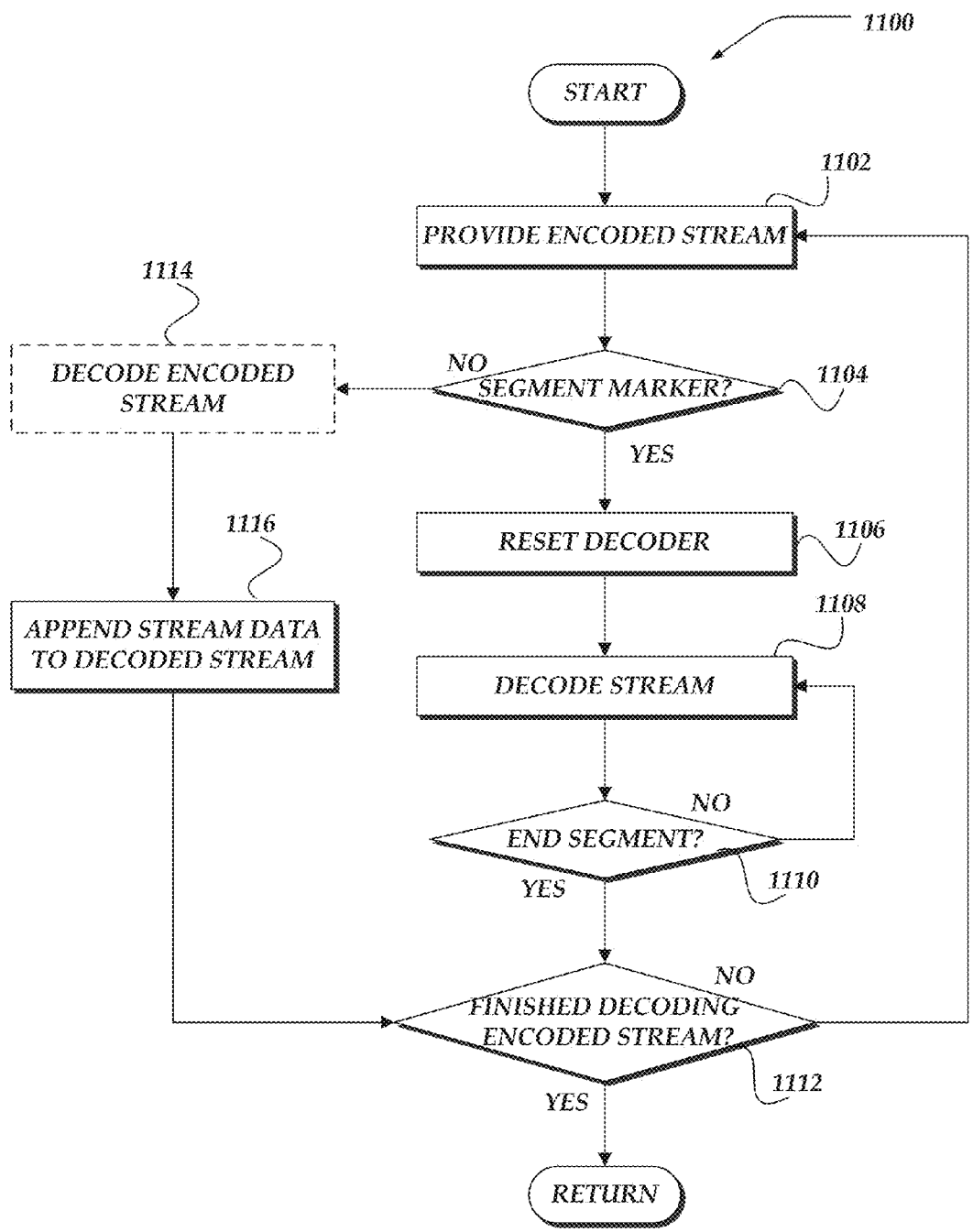
FIG. 11 illustrates a flowchart for a process for identifying and decoding independent segments within large-sized documents in accordance with one or more of the various embodiments.

FIG. 11 illustrates a flowchart for process 1100 for identifying and decoding independent segments within large-sized documents in accordance with one or more of the various embodiments. After a start block, at block 1102, in one or more of the various embodiments, an encoded stream may be provided to a decoding engine, such as decoding engine 324. See, block 902 for more details. Further, in one or more of the various embodiments, process 1100 may be considered to occur after the decoding session has been initialized. See, block 904 for more description about session initialization.

At decision block 1104, in one or more of the various embodiments, if a segment marker is encountered, control may flow to block 1106; otherwise, control may flow to block 1114. In one or more of the various embodiments, the decoding engine may be arranged to identify segment markers that may be included in the encoded stream. In some cases, the segment markers may be identified based on "magic strings," digital signatures, or codes embedded in the encoded stream. In other embodiments, the decoding engine may refer to segment metadata that may be associated with the encoded stream that is being decoded.

In one or more of the various embodiments, the decoding engine may be arranged to monitor decoding progress such that it may refer to the segment metadata to identify where in the encoded stream segment the markers may occur. For example, if the segment metadata indicates a segment marker present at position 12000 of the encoded stream, the decoding engine may check the segment marker once it reaches position 12000 of the encoded stream.

At block 1106, in one or more of the various embodiments, the decoding engine may reset its decoder. In one or more of the various embodiments, the decoding engine may be arranged to reset its decoder to an initial cryptographic state. As described above, this may include resetting one or more decoder components, such as electronic code books (ECBs), or the like, as described above. In one or more of the various embodiments, if sequential decoding is being used, resetting the decoder puts it back to a known starting state that may be based on the initialization parameters or initialization credentials.

At block 1108, in one or more of the various embodiments, the decoding engine may decode the encoded stream. In one or more of the various embodiments, the decoding engine may be arranged to decode the encoded stream. As usual, in some embodiments, the decoded data may be added to the output stream.

At decision block 1110, in one or more of the various embodiments, if the segment is decoded, control may flow to decision block 1112; otherwise, control may loop back to block 1102. In one or more of the various embodiments, the decoding engine may be arranged to refer to the segment metadata information for the current encoded segment. Accordingly, the size of the encoded segment may be available to decoding engine to use as a limit or threshold to identify the end of an encoded segment.

At decision block 1112, in one or more of the various embodiments, if the encoded stream has finished decoding, control may be returned to a calling process; otherwise, control may loop back to block 1102. In one or more of the various embodiments, the decoding engine may be arranged to continue decoding data from the encoded stream until the stream terminates or the decoding engine is otherwise directed to stop decoding. For example, in some embodiments, a client application may send a message using an API to terminate the decoding operation. Or, for example, the encoded stream may provide an end-of-stream (e.g., end-of-file, connection closed, or the like) indicator to the decoding engine that signal that the end of the encoded stream has been reached.

At block 1114, in one or more of the various embodiments, optionally, the decoding engine may be arranged to decode data provided by the encoded the stream. In some embodiments, to accommodate partially encoded streams, decoding engine may be arranged to pass through un-encoded data if there is any. Otherwise, the decoding engine may be arranged to decode the encoded data provided by the encoded stream.

At block 1116, in one or more of the various embodiments, the decoding engine may append the stream data to the output stream. Next, control may flow to decision block 1112. In one or more of the various embodiments, the decoding engine may be configured to pass some encoded stream data through without decoding. For example, in some embodiments, applications may be arranged to encode portions of the input stream while leaving the remained un-encoded. For example, in some embodiments, the input stream may be comprised of data packets that include header information and payload information. Accordingly, for example, the application may request that the header information portions remain un-encoded while the payload portions are encoded (e.g., as encoded segments). Next, control may flow to decision block 1112.

Figure 12:
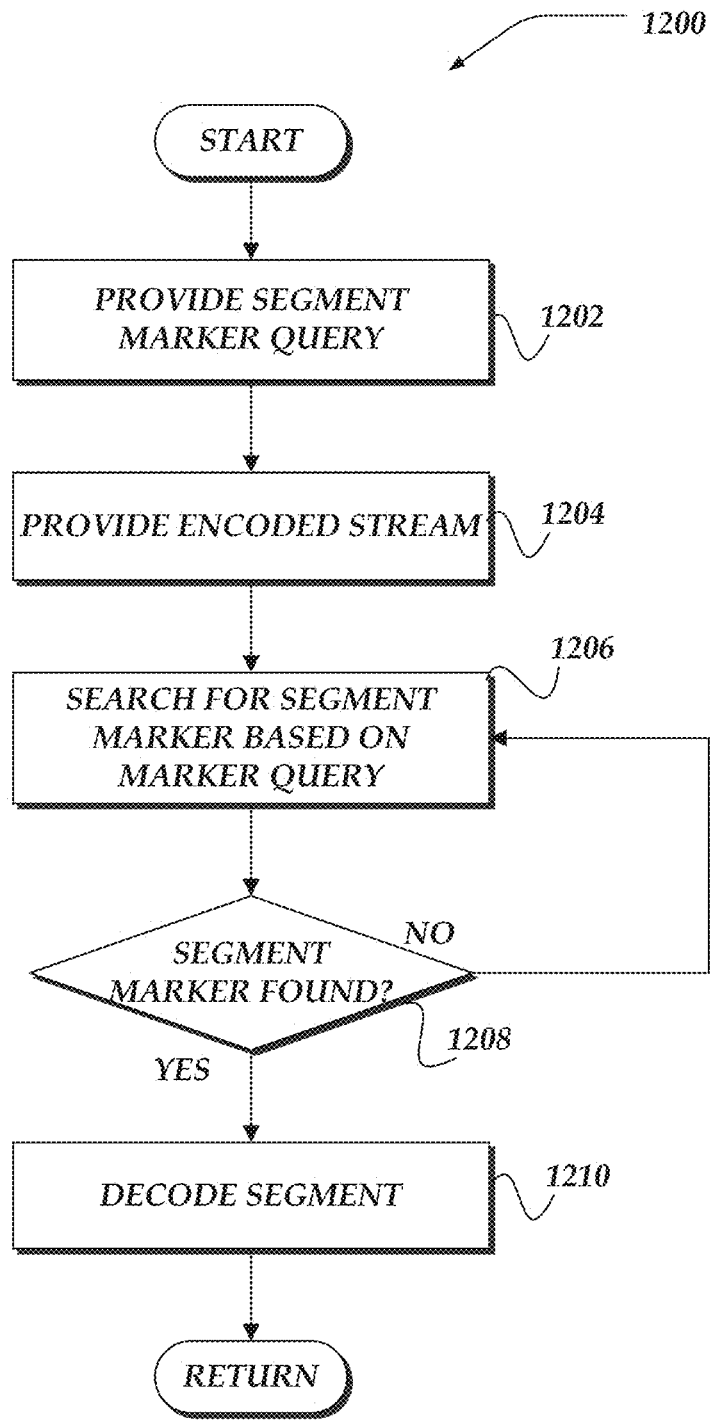
FIG. 12 illustrates a flowchart for a process for searching a marker and decoding the referenced segment independently within large-sized documents.

FIG. 12 illustrates a flowchart for process 1200 for searching a marker and decoding the referenced segment independently within large-sized documents in accordance with one or more of the various embodiments. In one or more of the various embodiments, segment markers enable a user or application to select one or more particular portions of an encoded stream for decoding. In one or more of the various embodiments, this may improve search performance by enable one or more encoded segments to be selected and decoded without having to decode the entire encoded stream.

After a start block, at block 1202, in one or more of the various embodiments, a segment marker query may be provided to a decoding engine, such as decoding engine 324. In one or more of the various embodiments, the decoding engine may be arranged to accept one or more queries for identifying one or more segment markers. In one or more of the various embodiments, the query may be designed to match one or more encoded segment attributes that may be record in the segment metadata that is associated with the encoded stream. In some embodiments, the query information may include expressions (e.g., string comparisons, wildcards, regular expressions, or the like) for matching one or more marker labels that may be listed in the segment metadata. Further, additional query expressions may include other criteria associated with encoded segments, such as, size information, or the like. Further, in one or more of the various embodiments, the query information may be position relative requests, such as, get next segment, skip N segments, previous segment, last segment, first segment, or the like.

At block 1204, in one or more of the various embodiments, an encoded stream may be provided to the decoding engine. See, block 902 for more details. Further, in one or more of the various embodiments, process 1200 may be considered to occur after the decoding session has been initialized. See, block 904 for more description about session initialization.

At block 1206, in one or more of the various embodiments, the decoding engine may search for one or more segment markers based on the provided segment marker query. In one or more of the various embodiments, the segment marker query may identify one or more encoded segment entries in the segment metadata. Accordingly, in one or more of the various embodiments, the decoding engine may be arranged to extract the offset position of the segment from the segment metadata. In one or more of the various embodiments, the decoding engine may seek through the encoded stream until the offset position corresponding the request encoded segment is reached. Note, the particular details of the seek operation may depend on the type of encoded stream and the data storage or file system where it may be located. For example, if the file system or data store the contains the encode stream (e.g., encoded file or document) is POSIX compliant, the lseek system call or its equivalent may be executed to locate the position in the encoded stream where the requested encoded segment is located.

At decision block 1208, in one or more of the various embodiments, if the segment marker is found, control may flow to block 1210; otherwise, control may loop back to block 1208.

At block 1210, in one or more of the various embodiments, the decoding engine may decode the segment. In one or more of the various embodiments, the decoding engine may be arranged to read include the encoded segment and decode it. Note, the encoded size attribute of the encoded segment that is listed in the segment metadata may be used by the decoding engine to define the extent of the segment of interest. Segment decoding is described in detail at blocks 1104-1110 in FIG. 11.

In one or more of the various embodiments, the decoding engine may compare the decoded data with the un-encoded size attribute for the segment that may be included in the segment metadata entry that corresponds to the encoded segment. In one or more of the various embodiments, if the requested encoded segment is decoded successfully, it may be provided as an output stream to the application the provided segment marker query. Next, in some embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data streams using a network computer that performs actions, comprising:
   when an input stream is provided to an encoding engine associated with one or more encoders, performing further actions, including:
   providing an encoded stream by encoding the input stream using the one or more encoders; and
   responsive to a request to insert a segment marker into the encoded stream, performing further actions, including:
   providing the segment marker that includes at least a marker label;
   restoring the one or more encoders to an initial cryptographic state;
   providing an encoded segment by encoding the input stream using the one or more encoders, wherein the encoded segment is included in the encoded stream, and wherein the segment marker is inserted in the encoded stream to demark the encoded segment; and
   when the step of providing the encoded segment is complete, updating segment metadata that is associated with the encoded stream to include one or more attributes that correspond to the encoded segment, wherein the one or more attributes include at least the marker label, an offset position of the encoded segment within the encoded stream, and a size of the encoded segment.

2. The method of claim 1, further comprising:
when the encoded stream is provided to a decoding engine associated with one or more decoders, performing further actions, including:
providing an output stream by decoding the encoded stream using the one or more decoders; and
responsive to encountering one or more encoded segments in the encoded stream, performing further actions, including:
providing the one or more attributes that correspond to the one or more encoded segments;
restoring the one or more decoders to the initial cryptographic state;
providing un-encoded data by decoding the one or more encoded segments using the one or more decoders and the one or more attributes; and
including the un-encoded data in the output stream.

3. The method of claim 1, wherein encoding the input stream further comprises,
selectively providing one or more un-encoded portions of the input stream based on messages provided by an application that provided the input stream; and
including the one or more un-encoded portions in the encoded stream.

4. The method of claim 1, wherein decoding the encoded stream further comprises, when un-encoded data is encountered while decoding the encoded stream, including the un-encoded data in the output stream.

5. The method of claim 1, further comprising:
providing session information based on one or more cryptographic keys; and
providing the initial cryptographic state based on the session information and one of a beginning of the input stream, a beginning of the encoded stream, a beginning of the encoded segment, or a beginning of a portion of the input stream that corresponds to the encoded segment.

6. The method of claim 1, further comprising, when a segment marker query is provided to the decoding engine, performing further actions, including:
providing a segment metadata entry based on the segment marker query;
providing one or more attributes that correspond to one or more encoded segments based on the segment marker query, wherein the one or more attributes that correspond to the one or more encoded segments are provided from the segment metadata entry;
searching the encoded stream to locate the one or more encoded segments based on the one or more attributes that correspond to the one or more encoded segments; and
decoding the one or more encoded segments.

7. The method of claim 1, further comprising, responsive to a request to insert the segment marker into an existing encoded segment, performing, further actions:
employing the decoding engine to provide un-encoded data that corresponds to the existing encoded segment;
providing a first encoded segment by encoding a first portion of the un-encoded data;
providing a second encoded segment by encoding a second portion of the un-encoded data, wherein the second encoded segment corresponds to the segment marker; and
overwriting the existing encoded segment by inserting the first encoded segment and the second encoded segment into the encoded stream.

8. The method of claim 1, wherein restoring the one or more encoders to an initial cryptographic state, further comprises, resetting one or more of electronic code books, buffered data, pipeline data, one or more counters, one or more cryptographic keys, one or more cryptographic certificates, one or more pseudo random numbers, one or more real random numbers, or one or more timers that are associated with the one or more encoders.

9. A system for managing data streams, comprising:
a network computer, comprising:
a transceiver that communicates over the network;
a memory that stores at least instructions; and
one or more processor devices that execute instructions that perform actions, including:
when an input stream is provided to an encoding engine associated with one or more encoders, performing further actions, including:
providing an encoded stream by encoding the input stream using the one or more encoders; and
responsive to a request to insert a segment marker into the encoded stream, performing further actions, including:
providing the segment marker that includes at least a marker label;
restoring the one or more encoders to an initial cryptographic state;
providing an encoded segment by encoding the input stream using the one or more encoders, wherein the encoded segment is included in the encoded stream, and wherein the segment marker is inserted in the encoded stream to demark the encoded segment; and
when the step of providing the encoded segment is complete, updating segment metadata that is associated with the encoded stream to include one or more attributes that correspond to the encoded segment, wherein the one or more attributes include at least the marker label, an offset position of the encoded segment within the encoded stream, and a size of the encoded segment; and
a client computer, comprising:
a client computer transceiver that communicates over the network;
a client computer memory that stores at least instructions; and
one or more processor devices that execute instructions that perform actions, including:
providing the request to insert the segment marker.

10. The system of claim 9, wherein the one or more network computer processor devices execute instructions that perform actions, further comprising:
when the encoded stream is provided to a decoding engine associated with one or more decoders, performing further actions, including:
providing an output stream by decoding the encoded stream using the one or more decoders; and
responsive to encountering one or more encoded segments in the encoded stream, performing further actions, including:
providing the one or more attributes that correspond to the one or more encoded segments;

restoring the one or more decoders to the initial cryptographic state;

providing un-encoded data by decoding the one or more encoded segments using the one or more decoders and the one or more attributes; and including the un-encoded data in the output stream.

11. The system of claim 9, wherein encoding the input stream further comprises, selectively providing one or more un-encoded portions of the input stream based on messages provided by an application that provided the input stream; and including the one or more un-encoded portions in the encoded stream.

12. The system of claim 9, wherein decoding the encoded stream further comprises, when un-encoded data is encountered while decoding the encoded stream, including the un-encoded data in the output stream.

13. The system of claim 9, wherein the one or more network computer processor devices execute instructions that perform actions, further comprising:

providing session information based on one or more cryptographic keys; and providing the initial cryptographic state based on the session information and one of a beginning of the input stream, a beginning of the encoded stream, a beginning of the encoded segment, or a beginning of a portion of the input stream that corresponds to the encoded segment.

14. The system of claim 9, wherein the one or more network computer processor devices execute instructions that perform actions, further comprising, when a segment marker query is provided to the decoding engine, performing further actions, including:

providing a segment metadata entry based on the segment marker query;

providing one or more attributes that correspond to one or more encoded segments based on the segment marker query, wherein the one or more attributes that correspond to the one or more encoded segments are provided from the segment metadata entry;

searching the encoded stream to locate the one or more encoded segments based on the one or more attributes that correspond to the one or more encoded segments; and decoding the one or more encoded segments.

15. The system of claim 9, wherein the one or more network computer processor devices execute instructions that perform actions, further comprising, responsive to a request to insert the segment marker into an existing encoded segment, performing, further actions:

employing the decoding engine to provide un-encoded data that corresponds to the existing encoded segment;

providing a first encoded segment by encoding a first portion of the un-encoded data;

providing a second encoded segment by encoding a second portion of the un-encoded data, wherein the second encoded segment corresponds to the segment marker; and overwriting the existing encoded segment by inserting the first encoded segment and the second encoded segment into the encoded stream.

16. The system of claim 9, wherein restoring the one or more encoders to an initial cryptographic state, further comprises, resetting one or more of electronic code books, buffered data, pipeline data, one or more counters, one or more cryptographic keys, one or more cryptographic certificates, one or more pseudo random numbers, one or more real random numbers, or one or more timers that are associated with the one or more encoders.

17. A processor readable non-transitory storage media that includes instructions for managing data streams, wherein execution of the instructions by one or more hardware processors performs actions, comprising:

when an input stream is provided to an encoding engine associated with one or more encoders, performing further actions, including:

providing an encoded stream by encoding the input stream using the one or more encoders; and responsive to a request to insert a segment marker into the encoded stream, performing further actions, including:

providing the segment marker that includes at least a marker label;

restoring the one or more encoders to an initial cryptographic state;

providing an encoded segment by encoding the input stream using the one or more encoders, wherein the encoded segment is included in the encoded stream, and wherein the segment marker is inserted in the encoded stream to demark the encoded segment; and when the step of providing the encoded segment is complete, updating segment metadata that is associated with the encoded stream to include one or more attributes that correspond to the encoded segment, wherein the one or more attributes include at least the marker label, an offset position of the encoded segment within the encoded stream, and a size of the encoded segment.

18. The media of claim 17, further comprising:

when the encoded stream is provided to a decoding engine associated with one or more decoders, performing further actions, including:

providing an output stream by decoding the encoded stream using the one or more decoders; and responsive to encountering one or more encoded segments in the encoded stream, performing further actions, including:

providing the one or more attributes that correspond to the one or more encoded segments;

restoring the one or more decoders to the initial cryptographic state;

providing un-encoded data by decoding the one or more encoded segments using the one or more decoders and the one or more attributes; and including the un-encoded data in the output stream.

19. The media of claim 17, wherein encoding the input stream further comprises, selectively providing one or more un-encoded portions of the input stream based on messages provided by an application that provided the input stream; and including the one or more un-encoded portions in the encoded stream.

20. The media of claim 17, wherein decoding the encoded stream further comprises, when un-encoded data is encountered while decoding the encoded stream, including the un-encoded data in the output stream.

21. The media of claim 17, further comprising:

providing session information based on one or more cryptographic keys; and providing the initial cryptographic state based on the session information and one of a beginning of the input stream, a beginning of the encoded stream, a beginning of the encoded segment, or a beginning of a portion of the input stream that corresponds to the encoded segment.

22. The media of claim 17, further comprising, when a segment marker query is provided to the decoding engine, performing further actions, including:
    providing a segment metadata entry based on the segment marker query;
    providing one or more attributes that correspond to one or more encoded segments based on the segment marker query, wherein the one or more attributes that correspond to the one or more encoded segments are provided from the segment metadata entry;
    searching the encoded stream to locate the one or more encoded segments based on the one or more attributes that correspond to the one or more encoded segments; and
    decoding the one or more encoded segments.

23. The media of claim 17, further comprising, responsive to a request to insert the segment marker into an existing encoded segment, performing, further actions:
    employing the decoding engine to provide un-encoded data that corresponds to the existing encoded segment;
    providing a first encoded segment by encoding a first portion of the un-encoded data;
    providing a second encoded segment by encoding a second portion of the un-encoded data, wherein the second encoded segment corresponds to the segment marker; and
    overwriting the existing encoded segment by inserting the first encoded segment and the second encoded segment into the encoded stream.

24. A network computer for managing data streams, comprising:
    a transceiver that communicates over the network;
    a memory that stores at least instructions; and
    one or more processor devices that execute instructions that perform actions, including:
        when an input stream is provided to an encoding engine associated with one or more encoders, performing further actions, including:
            providing an encoded stream by encoding the input stream using the one or more encoders; and
            responsive to a request to insert a segment marker into the encoded stream, performing further actions, including:
                providing the segment marker that includes at least a marker label;
                restoring the one or more encoders to an initial cryptographic state;
                providing an encoded segment by encoding the input stream using the one or more encoders, wherein the encoded segment is included in the encoded stream, and wherein the segment marker is inserted in the encoded stream to demark the encoded segment; and
            when the step of providing the encoded segment is complete, updating segment metadata that is associated with the encoded stream to include one or more attributes that correspond to the encoded segment, wherein the one or more attributes include at least the marker label, an offset position of the encoded segment within the encoded stream, and a size of the encoded segment.

25. The network computer of claim 24, further comprising:
    when the encoded stream is provided to a decoding engine associated with one or more decoders, performing further actions, including:
        providing an output stream by decoding the encoded stream using the one or more decoders; and
        responsive to encountering one or more encoded segments in the encoded stream, performing further actions, including:
            providing the one or more attributes that correspond to the one or more encoded segments;
            restoring the one or more decoders to the initial cryptographic state;
            providing un-encoded data by decoding the one or more encoded segments using the one or more decoders and the one or more attributes; and
            including the un-encoded data in the output stream.

26. The network computer of claim 24, wherein encoding the input stream further comprises,
    selectively providing one or more un-encoded portions of the input stream based on messages provided by an application that provided the input stream; and
    including the one or more un-encoded portions in the encoded stream.

27. The network computer of claim 24, wherein decoding the encoded stream further comprises, when un-encoded data is encountered while decoding the encoded stream, including the un-encoded data in the output stream.

28. The network computer of claim 24, further comprising:
    providing session information based on one or more cryptographic keys; and
    providing the initial cryptographic state based on the session information and one of a beginning of the input stream, a beginning of the encoded stream, a beginning of the encoded segment, or a beginning of a portion of the input stream that corresponds to the encoded segment.

29. The network computer of claim 24, further comprising, when a segment marker query is provided to the decoding engine, performing further actions, including:
    providing a segment metadata entry based on the segment marker query;
    providing one or more attributes that correspond to one or more encoded segments based on the segment marker query, wherein the one or more attributes that correspond to the one or more encoded segments are provided from the segment metadata entry;
    searching the encoded stream to locate the one or more encoded segments based on the one or more attributes that correspond to the one or more encoded segments; and
    decoding the one or more encoded segments.

30. The network computer of claim 24, further comprising, responsive to a request to insert the segment marker into an existing encoded segment, performing, further actions:
    employing the decoding engine to provide un-encoded data that corresponds to the existing encoded segment;
    providing a first encoded segment by encoding a first portion of the un-encoded data;
    providing a second encoded segment by encoding a second portion of the un-encoded data, wherein the second encoded segment corresponds to the segment marker; and
    overwriting the existing encoded segment by inserting the first encoded segment and the second encoded segment into the encoded stream.

* * * * *

UNITED STATES PATENT AND TRADEMARK OFFICE
CERTIFICATE OF CORRECTION

PATENT NO.       : 9,660,967 B1  
APPLICATION NO.  : 15/402122  
DATED            : May 23, 2017  
INVENTOR(S)      : Paris et al.

Page 1 of 4

It is certified that error appears in the above-identified patent and that said Letters Patent is hereby corrected as shown below:

On the Title Page

In Item (56), under "U.S. PATENT DOCUMENTS", in Column 2, Line 1, delete "Forlenza" and insert -- Forlenza et al. --, therefor.

On Page 2, in Item (56), under "U.S. PATENT DOCUMENTS", in Column 1, Line 1, delete "Wack" and insert -- Wack et al. --, therefor.

On Page 2, in Item (56), under "U.S. PATENT DOCUMENTS", in Column 1, Line 3, delete "Wan" and insert -- Wan et al. --, therefor.

On Page 2, in Item (56), under "U.S. PATENT DOCUMENTS", in Column 1, Line 5, delete "Ramesh" and insert -- Ramesh et al. --, therefor.

In the Drawings

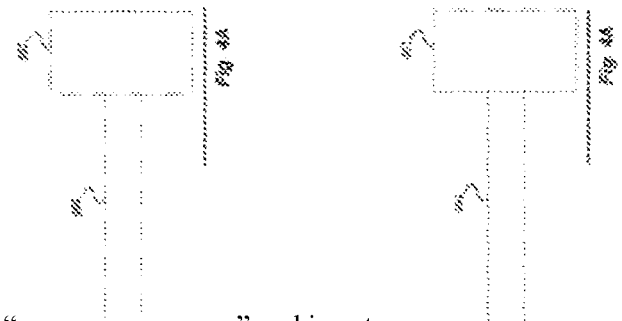

In Fig. 4A, Sheet 4 of 12, delete " " and insert --  --, therefor.

Signed and Sealed this  
Twenty-ninth Day of May, 2018

Andrei Iancu  
*Director of the United States Patent and Trademark Office*

In Fig. 5A, Sheet 5 of 12, delete " 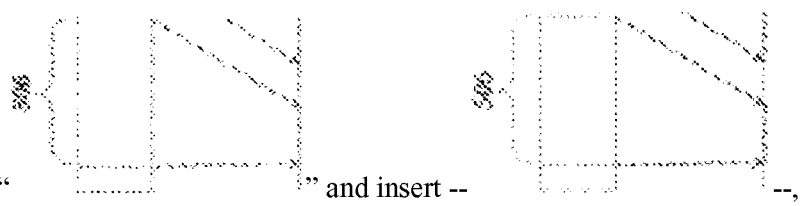 " and insert -- --, therefor.

In Fig. 11, Sheet 11 of 12, for Block "1116", in Line 2, delete "DECODED" and insert -- OUTPUT --, therefor.

In the Specification

In Column 5, Lines 57-58, delete "decoders. in" and insert -- decoders. In --, therefor.

In Column 7, Line 31, delete "a wireless" and insert -- wireless --, therefor.

In Column 8, Lines 5-6, delete "client computers 103-105" and insert -- client computers 102-105 --, therefor.

In Column 8, Line 10, delete "client computers 103-105." and insert -- client computers 102-105. --, therefor.

In Column 8, Line 22, delete "4th (4G)" and insert -- 4th (4G), --, therefor.

In Column 8, Line 27, delete "client computers 103-105" and insert -- client computers 102-105 --, therefor.

In Column 8, Line 30, delete "Mobil" and insert -- Mobile --, therefor.

In Column 8, Line 32, delete "Enhanced Data GSM Environment (EDGE)," and insert -- Enhanced Data rates for GSM Evolution (EDGE), --, therefor.

In Column 8, Line 39, delete "client computers 103-105" and insert -- client computers 102-105 --, therefor.

In Column 9, Line 51, delete "(GPS) receiver 258," and insert -- (GPS) transceiver 258, --, therefor.

In Column 10, Line 6, delete "OSI model" and insert -- Global system --, therefor.

In Column 10, Line 8, delete "SIP/RTP, GPRS," and insert -- SIP/RTP, --, therefor.

In Column 10, Line 13, delete "(MC)." and insert -- (NIC). --, therefor.

In Column 11, Line 13, delete "Energy. or" and insert -- Energy, or --, therefor.

CERTIFICATE OF CORRECTION (continued)

In Column 11, Line 34, delete "computer 200" and insert -- computer 200. --, therefor.

In Column 12, Lines 23-24, delete "a wireless" and insert -- wireless --, therefor.

In Column 12, Line 30, delete "HTMLS," and insert -- HTML5, --, therefor.

In Column 13, Line 20, delete "system-on-a-chips (SOCs)" and insert -- system-on-chips (SOCs) --, therefor.

In Column 13, Line 34-35, delete "modeling platform server computer 116" and insert -- data coding server computers 116 --, therefor.

In Column 13, Line 40, delete "(GPS) receiver 362" and insert -- (GPS) transceiver 362 --, therefor.

In Column 14, Line 43, delete "computer 300" and insert -- computer 300. --, therefor.

In Column 15, Lines 24-25, delete "Data storage 410" and insert -- Data storage 310 --, therefor.

In Column 16, Line 23, delete "cloud-based based" and insert -- cloud-based --, therefor.

In Column 16, Lines 40-41, delete "may be employ" and insert -- may be employed --, therefor.

In Column 16, Line 51, delete "Logic (PALs)," and insert -- Logics (PALs), --, therefor.

In Column 16, Line 62, delete "Systems on Chips." and insert -- System-on-Chips. --, therefor.

In Column 16, Line 64, delete "illustrates" and insert -- illustrate --, therefor.

In Column 17, Lines 26-27, delete "input stream 406" and insert -- input stream 404 --, therefor.

In Column 19, Lines 39-40, delete "so on," and insert -- so on. --, therefor.

In Column 22, Lines 7-8, delete "encoded size 708," and insert -- encoded size 706, --, therefor.

In Column 22, Line 8, delete "un-encoded size," and insert -- un-encoded size 708, --, therefor.

In Column 29, Line 43, delete "store the" and insert -- store that --, therefor.

In the Claims

In Column 31, Line 23, in Claim 3, delete "comprises," and insert -- comprises: --, therefor.

In Column 31, Line 59, in Claim 7, delete "performing, further" and insert -- performing further --, therefor.

CERTIFICATE OF CORRECTION (continued)
U.S. Pat. No. 9,660,967 B1

In Column 33, Line 8, in Claim 11, delete "comprises," and insert -- comprises: --, therefor.

In Column 33, Line 50, in Claim 15, delete "performing, further" and insert -- performing further --, therefor.

In Column 34, Line 52, in Claim 19, delete "comprises," and insert -- comprises: --, therefor.

In Column 35, Line 21, in Claim 23, delete "performing, further" and insert -- performing further --, therefor.

In Column 36, Line 17, in Claim 26, delete "comprises," and insert -- comprises: --, therefor.

In Column 36, Line 54, in Claim 30, delete "performing, further" and insert -- performing further --, therefor.